United States Patent
Treat et al.

(10) Patent No.: US 10,003,608 B2
(45) Date of Patent: *Jun. 19, 2018

(54) AUTOMATED INSIDER THREAT PREVENTION

(71) Applicant: Palo Alto Networks, Inc., Santa Clara, CA (US)

(72) Inventors: Tim Treat, Morgan Hill, CA (US); Cyrus Ziaeian, Morgan Hill, CA (US); Gregory Grzegorzyk, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/472,083

(22) Filed: Mar. 28, 2017

(65) Prior Publication Data

US 2017/0264628 A1 Sep. 14, 2017

Related U.S. Application Data

(63) Continuation of application No. 14/859,081, filed on Sep. 18, 2015, now Pat. No. 9,641,544.

(51) Int. Cl.
*H04L 29/06* (2006.01)
*H04L 12/26* (2006.01)
*H04L 12/815* (2013.01)
*H04L 29/08* (2006.01)

(52) U.S. Cl.
CPC .......... *H04L 63/1425* (2013.01); *H04L 43/04* (2013.01); *H04L 63/02* (2013.01); *H04L 63/0428* (2013.01); *H04L 47/22* (2013.01); *H04L 67/22* (2013.01)

(58) Field of Classification Search
CPC ..... H04L 63/1425; H04L 43/04; H04L 63/02; H04L 63/0428; H04L 47/22; H04L 67/22
See application file for complete search history.

(56) References Cited

U.S. PATENT DOCUMENTS

| 6,772,332 B1 | 8/2004 | Boebert |
| 7,089,592 B2 | 8/2006 | Adjaoute |
| 7,386,889 B2 | 6/2008 | Shay |

(Continued)

FOREIGN PATENT DOCUMENTS

WO WO-2014138115 9/2014

OTHER PUBLICATIONS

Darren Manners, "The user agent field: Analyzing and detecting the abnormal or malicious in your organization", Published Oct. 20, 2011, Retrieved From https://www.sans.org/reading-room/whitepapers/malicious/user-agent-field-analyzing-detecting-abnormal-malicious-organization-33874.*

(Continued)

*Primary Examiner* — Chau Le
(74) *Attorney, Agent, or Firm* — Van Pelt, Yi & James LLP

(57) ABSTRACT

Techniques for automated insider threat prevention are disclosed. In some embodiments, a system, process, and/or computer program product for automated insider threat prevention includes monitoring network communications at a network device; detecting an anomalous activity based on the monitored network communications associated with a user based on a behavior profile for the user; and performing an action in response to the detected anomalous activity based on a policy.

29 Claims, 13 Drawing Sheets

(56) References Cited

U.S. PATENT DOCUMENTS

| | | | |
|---|---|---|---|
| 7,747,730 | B1 | 6/2010 | Harlow |
| 7,801,518 | B1* | 9/2010 | Urbanek ............. G06F 11/3466 455/343.5 |
| 7,930,746 | B1* | 4/2011 | Sheleheda ........... H04L 63/1416 713/151 |
| 7,958,228 | B2* | 6/2011 | Riise ...................... G06Q 10/00 379/106.02 |
| 8,131,851 | B2 | 3/2012 | Harlow |
| 9,043,905 | B1 | 5/2015 | Allen |
| 9,348,985 | B2* | 5/2016 | Davis .................... G06F 21/316 |
| 9,648,035 | B2* | 5/2017 | Basavapatna ....... H04L 63/1433 |
| 2007/0058551 | A1 | 3/2007 | Brusotti |
| 2007/0195753 | A1 | 8/2007 | Judge |
| 2007/0199061 | A1* | 8/2007 | Byres ................. H04L 41/0806 726/11 |
| 2007/0206741 | A1* | 9/2007 | Tiliks .................. H04M 3/2281 379/106.02 |
| 2007/0294369 | A1 | 12/2007 | Ginter et al. |
| 2008/0047009 | A1* | 2/2008 | Overcash ............ H04L 63/0209 726/23 |
| 2008/0175226 | A1 | 7/2008 | Alperovitch |
| 2009/0178139 | A1 | 7/2009 | Stute |
| 2011/0238979 | A1 | 9/2011 | Harp |
| 2013/0291099 | A1* | 10/2013 | Donfried ............ G06Q 30/0637 726/22 |
| 2013/0298244 | A1 | 11/2013 | Kumar |
| 2016/0142435 | A1* | 5/2016 | Bernstein ............ H04L 63/1441 726/23 |
| 2016/0164893 | A1* | 6/2016 | Levi .................... H04L 63/1416 726/23 |
| 2016/0191563 | A1* | 6/2016 | Beauchesne ........ H04L 63/1425 726/25 |
| 2017/0237762 | A1* | 8/2017 | Ogawa ................ H04L 63/1425 726/23 |
| 2017/0279819 | A1* | 9/2017 | More .................. H04L 63/1416 |

OTHER PUBLICATIONS

Microsoft, "Security Monitoring and Attack Detection", Microsoft MSDN Library, Published Aug. 29, 2006, Retrieved From https://msdn.microsoft.com/en-us/library/cc875806.aspx.*

Author Unknown, Threat Analytics Platform, Gurducul Predictive Security Analytics, downloaded from gurucul.com_wp-content_uploads_2015_04_TAP on May 20, 2015.

Cappelli et al., Common Sense Guide to Prevention and Detection of Insider Threats, 3rd Edition, Version 3.1, CyLab, Jan. 2009.

Dan Cybulski, Palo Alto Networks Uses Neural Networks to Attack Insider Threat, Apr. 9, 2015.

Freiling et al., Botnet tracking: Exploring a Root-Cause Methodology to Prevent Distributed Denial-Of-Service Attacks, Retrieved from http://link.springer.com/chapter/10.1007%2F11555827_19 , European Symposium on Research in Computer Security. Springer Berlin Heidelberg, 2005.

Greitzer et al., Predictive Modeling for Insider Threat Mitigation, Pacific Northwest National Laboratory, Apr. 2009.

Schnackengerg et al., Cooperative Intrusion Traceback and Response Architecture (CITRA), Retrieved from http://ieeexplore.ieee.org/stamp/stamp.jsp?arnumber=932192, DARPA Information Survivability Conference & Exposition II, 2001. Discex'01. Proceedings. vol. 1. IEEE, 2001.

Silowash et al., Insider Threat Control: Understanding Data Loss Prevention (DLP) and Detection by Correlating Events from Multiple Sources, Software Engineering Institute, Carnegie Mellon, Jan. 2013.

Stiawan et al, Characterizing Network Intrusion Prevention System, International Journal of Computer Applications, vol. 14, Jan. 2011.

Tim Treat, What We Learn From Protecting Artificially Intelligent Cars, Palo Alto Networks, Sep. 5, 2014.

Warkentin et al., Behavioral and Policy Issues in Information Systems Security: The Insider Threat, European Journal of Information Systems, Apr. 2009.

* cited by examiner

Detailed Log View

General
- Session ID: 6
- Action: allow
- Application: web-browsing
- Rule: rule-bug72825
- Category: business-and-economy
- Virtual System: vsys2
- Device SN:
- IP Protocol: tcp
- Log Action:
- Generated Time: 2015/01/22 10:20:18
- Start Time: 2015/01/22 10:19:27
- Receive Time: 2015/01/22 10:20:18
- Elapsed Time(sec): 0

Source
- User:
- Address: 10.33.164.32
- Country: 10.0.0.0-10.255.255.255
- Port: 15897
- Zone: cyrus-trust
- Interface: ethernet1/10

Destination
- User:
- Address: 199.27.109.206
- Country: US
- Port: 80
- Zone: cyrus-untrust
- Interface: ethernet1/11

Session Counters
- Bytes: 6579
- Bytes Received: 0
- Bytes Sent: 6579
- Repeat Count: 1
- Packets: 7
- Packets Received: 0
- Packets Sent: 7

Flags
- ☐ Captive Portal
- ☐ Proxy Transaction
- ☐ Decrypted
- ☐ Packet Capture
- ☐ Client to Server
- ☐ Server to Client
- ☐ Symmetric Return
- ☐ Mirrored

Log Links

Related Logs (+/- 24 Hours)

| Receive Time | Log | Type | Application | Action | Rule | Bytes | Packets | Severity | Category | URL / File Name |
|---|---|---|---|---|---|---|---|---|---|---|
| 01/21 19:04:37 | Traffic | end | Incomplete | allow | rule-any | 6,579 | 7 | | | |
| 01/21 23:11:16 | Traffic | end | Incomplete | allow | rule-any | 6,579 | 7 | | | |
| 01/22 10:20:18 | Threat | url | web-browsing | alert | rule-bug72825 | | | Informational | Business-and-economy | www.building dashboard.com/scripts/rpc.php |
| 01/22 10:20:18 | Traffic | end | web-browsing | allow | rule-bug72825 | 6,579 | 7 | | | |

Close

FIG. 10

AUTOMATED INSIDER THREAT PREVENTION

CROSS REFERENCE TO OTHER APPLICATIONS

This application is a continuation of co-pending U.S. patent application Ser. No. 14/859,081 entitled AUTOMATED INSIDER THREAT PREVENTION, filed Sep. 18, 2015, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 10 is a screen diagram illustrating a screen shot of a log view generated by the integrated platform for providing automated insider threat prevention in accordance with some embodiments.

DETAILED DESCRIPTION

Figure 1:
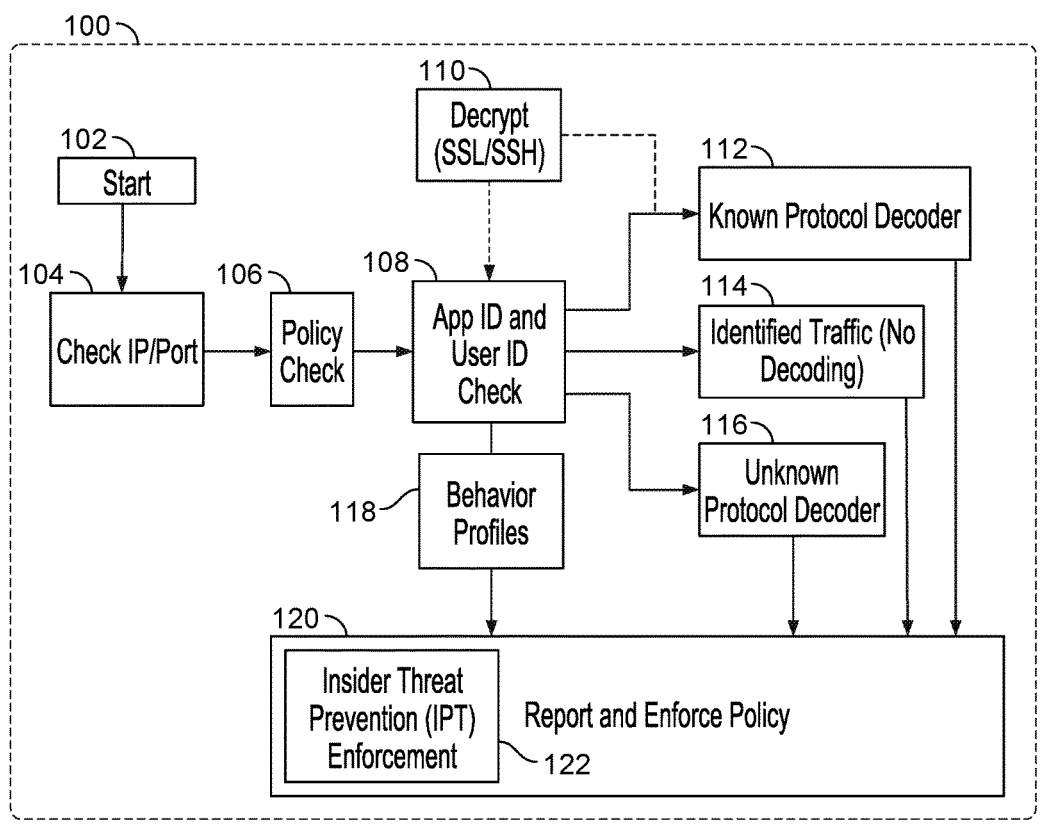
FIG. 1 is a functional diagram of an architecture of a network device that can be used for providing automated insider threat prevention in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Network devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. located in Santa Clara, Calif. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

Insider threats are a growing problem that confronts nearly every organization (e.g., enterprise, including private, non-government, and government entities). A number of breaches that are ultimately detected, however many breaches actually go undetected, can be traced back to malicious or exploited insiders (e.g., an authorized user on an enterprise network that behaves maliciously or is exploited by an outsider attacker to exfiltrate data from the enterprise), which are often targeted attacks on a given organization (e.g., in some cases, such targeted attacks utilize APTs, such as discussed above). As such, detecting and defending against insider threats presents a serious issue and challenge for organizations to protect their data and enterprise networks. As an example scenario, an intruder or insider threat that is already within the enterprise network can be difficult to detect and/or defend against given that the threat is operating from inside the enterprise network (e.g., the perimeter security protection of the enterprise network has already been breached/compromised by the targeted attack). Even if such breaches/intrusions are later detected, such detection is typically too late as it is after the fact that such breaches/intrusions have occurred and may have successfully exfiltrated data from the enterprise network of the organization (e.g., loss of confidential data, intellectual property, and/or other sensitive data has been exfiltrated from the enterprise).

However, existing technology-based security approaches fail to provide for insider threat prevention that can adequately address the above-described problems. For example, legacy port-based security/firewall practices are generally inadequate. Also, there has been a proliferation of advanced tactics of attackers that existing Data Loss Prevention (DLP) tools generally fail to detect and/or prevent. In addition, existing technology-based security approaches typically have a limited visibility and control of all applications, users and network traffic, and/or limited threat vector coverage. Further, complex, non-integrated systems and manual burden for professionals increase the challenges for detecting and defending against insider threats.

In particular, sophisticated attackers are increasingly using targeted and new unknown variants of malware to avoid detection by existing technology-based security approaches (e.g., traditional security products/solutions). For example, advanced security threats (e.g., advanced cyber-attacks) are employing stealthy, persistent methods to evade traditional security measures (e.g., APTs). Skilled adversaries (e.g., attackers) demand that modern security teams re-evaluate their basic assumptions that traditional intrusion prevention and DLP systems, antivirus, and single-purpose sandbox appliances are up to the task of defeating advanced security threats, such as APTs and other techniques utilized by insider threats to, for example, exfiltrate data from enterprise networks.

Overview of Techniques for Automated Insider Threat Prevention

Thus, what are needed are new and improved techniques for insider threat prevention.

Accordingly, techniques for automated insider threat prevention are disclosed. For example, the disclosed techniques for automated insider threat prevention can detect and prevent insider threats based on file transfer application behaviors and activity utilizing an integrated and distributed platform for automated insider threat prevention (e.g., including one or more network devices for monitoring network communications for file transfer activities and in coordination with endpoint agents deployed on client devices for monitoring applications executed on the client devices for file transfer activities).

In some embodiments, a system, process, and/or computer program product for automated insider threat prevention includes monitoring network communications at a network device (e.g., which can include a firewall); detecting an anomalous activity based on the monitored network communications associated with a user based on a behavior profile for the user; and performing an action in response to the detected anomalous activity based on a policy. For example, the behavior profile for the user can include a plurality of metrics based on one or more file transfer application activities associated with the user, and the detected anomalous activity can be associated with a suspicious or disallowed file transfer activity (e.g., based on one or more file transfer application activities associated with the user).

For example, Palo Alto Networks provides a fully integrated security platform, that can generally be referred to as a system-of-systems, with the ability to characterize (e.g., with granularity) network traffic at various different locations on a global network (e.g., using a Next Generation Firewall(s)) and protect critical processes on endpoints (e.g., Advanced Endpoint Protection agents), which provides a Next-Generation Security Platform that facilitates superior data collection for security and data integrity as further described below with respect to various embodiments. As such, the disclosed coupling of such a platform and such enhanced data collection with globally scaled intelligence (e.g., Threat Intelligence Cloud), an advanced analytics for data integrity and enhanced security are provided. For instance, various new and distinct forms of preventive, predictive, and prescriptive models are introduced to effectively counter internal attackers and achieve insider threat prevention, such as will be further described below.

For example, the disclosed techniques can including monitoring network communications (e.g., decoding network traffic) using one or more network devices (e.g., a security appliance that includes a firewall) regardless of port (e.g., including SSL or other encrypted network communications, which can be decrypted at the network device). The disclosed techniques can successfully eliminate an attacker's success by using the below-described insider threat prevention techniques (e.g., to detect and prevent an insider's threat/attack in (near) real-time, as compared to an after-the-fact analysis and correlation of log files). In some cases, the disclosed techniques include providing visibility and control of applications, user network activities, and network communications by deploying a distributed and intelligently integrated security solution for automated insider threat prevention (e.g., an integrated and distributed platform for automated insider threat prevention), which includes a threat vector coverage across an enterprise network and endpoints in the enterprise network (e.g., providing visibility into network traffic, network devices, and endpoint devices, including operating systems, applications, and users) utilizing a fully automated and integrated network, intelligence (e.g., employing various data mining techniques, such as semi-supervised or unsupervised machine learning techniques (MLT) to generate real-time, rapidly evolving behavior profiles for users across the enterprise network), and endpoint protection as further described below.

In one embodiment, a system, process, and/or computer program product for automated insider threat prevention further includes monitoring a file transfer application activity based on the monitored network communications, in which the monitored network communications are determined to be associated with the user; and detecting the anomalous activity based on the monitored file transfer application activity associated with the user based on the behavior profile for the user.

In one embodiment, the network device is in communication with an endpoint agent executed on a client device associated with the user, in which the endpoint agent is configured to monitor a file transfer application executed on the client device, and a system, process, and/or computer program product for automated insider threat prevention further includes receiving a notification of a file transfer application activity associated with the file transfer application executed on the client device from the endpoint agent; and detecting the anomalous activity based on the monitored file transfer application activity associated with the user based on the behavior profile for the user, in which the monitored file transfer application activity associated with the user is detected using the endpoint agent executed on the client device and/or a firewall executed on the network device.

In one embodiment, a system, process, and/or computer program product for automated insider threat prevention further includes throttling a connection associated with the anomalous activity, block the connection associated with the anomalous activity, kill a process associated with the anomalous activity, generate an alert based on the anomalous activity, log the anomalous activity, update the behavior profile for the user based on the anomalous activity, or any combination thereof.

In one embodiment, a system, process, and/or computer program product for automated insider threat prevention further includes detecting an anomalous file transfer activity based on the monitored network communications associated with the user based on the behavior profile for the user; and performing an action in response to the anomalous file transfer activity. For example, the action performed in response to the anomalous file transfer activity can include the following: block the anomalous file transfer activity, throttle the anomalous file transfer activity, generate an alert based on the anomalous file transfer activity, log the anomalous file transfer activity, update the behavior profile for the user based on the anomalous file transfer activity, or any combination thereof.

In one embodiment, a system, process, and/or computer program product for automated insider threat prevention further includes sending a notification associated with the anomalous activity to another network device and/or receiving a notification associated with another anomalous activity associated with another user from another network device, in which the another anomalous activity is detected based on monitored network communications associated with the another user based on another behavior profile for the another user.

In one embodiment, a system, process, and/or computer program product for automated insider threat prevention further includes sending a notification associated with the anomalous activity to a cloud security service and/or receiving a notification associated with another anomalous activity associated with the user or with another user from the cloud security service.

In one embodiment, a system, process, and/or computer program product for automated insider threat prevention further includes monitoring network communications between a client device and an external site; determining if the network communications between the client device and the external site include a file transfer activity from the client device to the external site; and performing an action in response to determining that the network communications between the client device and the external site include the file transfer activity from the client device to the external site.

In one embodiment, a system, process, and/or computer program product for automated insider threat prevention further includes correlation of metrics and/or monitored network activities to determine that a given network activity is an anomalous activity. For example, a static default value can be utilized for thresholds for metrics to provide a baseline user behavior profile. These thresholds and/or metrics can be updated (e.g., trained) based on monitored activities for one or more users (e.g., a specific user and/or a group of users, such as based on job/role of the group of users, such as executive group, engineering group, marketing group, finance group, sales group, legal group, etc.). As an example, in a learning mode/training mode, these thresholds and/or metrics can be dynamically tuned to adjust such default values for thresholds for metrics to provide a dynamically generated baseline user behavior profile. In an example implementation, one or more Machine Learning Techniques (MLT) can be utilized for implementing these trainings and applications of these user behavior profiles, such as Bayesian, Kohonen—Self-Organizing Map (SOM), and/or other MLT techniques can be implemented as will be further described below.

In one embodiment, a system, process, and/or computer program product for automated insider threat prevention further includes sharing anomalous activity information for automated insider threat prevention. For example, an integrated and distributed platform for automated insider threat prevention can be provided that shares anomalous activity information (e.g., anomalous file transfer activity) across a plurality of network devices, such as further described below. As another example, an integrated and distributed platform for automated insider threat prevention can be provided that shares anomalous activity information (e.g., anomalous file transfer activity) with a cloud security service, such as further described below.

In one embodiment, the policy is implemented as a per user policy. For example, a policy can be specific to individual users and/or to groups of users (e.g., executive group, engineering group, marketing group, finance group, sales group, legal group, etc.).

As an example use case scenario, the disclosed techniques can provide an integrated and distributed platform for automated insider threat prevention that includes one or more network devices (e.g., security appliances that can include a firewall) and endpoint agents (e.g., endpoint security agents that can be deployed and executed on client devices) to monitor network traffic, applications, and user activities on an enterprise network, detect anomalous activities associated with a user based on a behavior profile for the user, and to perform responsive actions based on a policy (e.g., block file transfer attempts using the network device and/or kill a file transfer application/process on a client device using the endpoint agent).

For example, assume that Alice is an employee of ACME Company who has access to an enterprise network for ACME Company, and assume that an example security policy for ACME Company (e.g., insider threat prevention (ITP) policy) caps file transfers to 10 megabytes (MB) within a predefined period of time to an offsite site (e.g., Box, Gmail, or other apps/web services). In this case, a network device can detect a file transfer activity that violates this example ITP policy (e.g., based on APP ID and user ID techniques as described below), and the network device can then block that file transfer activity or perform another responsive action based on this example ITP policy.

As another example, assume that Alice typically uses Box and Gmail but does not typically use Yahoo mail or Dropbox, and assume that a behavior profile for Alice is configured to associate Yahoo mail and Dropbox as file transfer activity applications that are commonly used by Alice. In this case, a network device and/or endpoint agent can detect a file transfer activity that does not match the behavior profile for Alice (e.g., based on APP ID and user ID techniques as described below, it can be determined that Alice is sending a threshold amount of data in a predefined period of time using such a new FT service/application), and the network device and/or endpoint agent can then block/kill that file transfer activity or perform another responsive action based on this example ITP policy (e.g., in which the file transfer activity that does not match the behavior profile for Alice is determined to be an anomalous file transfer activity associated with Alice based on this example ITP policy). Examples of other responsive actions can include generate an alert, verify the file transfer activity (e.g., require two-factor authentication by Alice for access to the enterprise network), perform further inspection of file transfer and/or other activities associated with Alice, perform a scan of and/or quarantine Alice's client device(s), restrict Alice's access to sensitive enterprise data, and/or other responsive actions can be performed such as further described below.

As yet another example, assume that Bob, who is another employee of ACME Company, attempts to copy a threshold amount of data (e.g., greater than 10 MB based on this example ITP policy) to a portable drive (e.g., USB/thumb drive) connected to his enterprise laptop computer (e.g., detected by an endpoint agent executed on the laptop computer), then the endpoint agent can determine that this is an anomalous file transfer activity based on this example ITP policy and perform a responsive action and/or the endpoint agent can communicate the monitored file transfer activity to a network device and/or cloud security service, which can then determine that such is an anomalous file transfer activity based on this example ITP policy and perform a responsive action using the cloud security service, the network device, the endpoint agent, or any combination thereof. Examples of such responsive actions can include block/kill the file transfer activity, generate an alert (e.g., notify physical security to obtain the portable drive from the user if the user is on premises of ACME Company property), verify the file transfer activity (e.g., require two-factor authentication by Bob for access to the enterprise network), perform further inspection of file transfer and/or other activities associated with Alice, perform a scan of and/or quarantine Bob's client device(s), restrict Bob's access to sensitive enterprise data, and/or other responsive actions can be performed such as further described below. In this latter example, this may be a result of an insider attack being intentionally performed by Bob to exfiltrate data from ACME Company whereas the previous two examples with respect to Alice may be an indication of an insider attack being intentionally performed by Alice or may be a result of a targeted attack that is being perpetrated by an outside attacker utilizing Alice's credentials/device(s) (e.g., stolen or otherwise compromised user credentials) to exfiltrate data from ACME Company. As further described below, the disclosed techniques can be performed using a (near) real-time data stream for analysis (e.g., the data stream can include state information associated with a client device, application(s) executed on the client device, and/or network communications associated with an application, user, and/or content) instead of legacy, post-action analysis of logs (e.g., after the fact queries of log files and manual analysis of such log files).

The disclosed techniques facilitate identifying and preventing unwanted activity, misuse, insider threats, and known tactics of attackers on an enterprise network. In addition, the disclosed techniques automate prevention (e.g., insider attack prevention) by interceding as events (e.g., anomalous events associated with a user activity that can be determined to be a suspicious or malicious insider threat activity, such as based on a threshold comparison of one or more metrics/attributes with a behavior profile for the user) occur rather than post-event using reactive log correlation and/or manual analysis approaches. As a result, the disclosed techniques can reduce risk and the attack surface of interconnected systems and applications on an enterprise network by detecting and preventing insider threats, unwanted user behavior and tactics used to exfiltrate protected and sensitive information from the enterprise. The disclosed techniques can also facilitate enhanced security intelligence that is automatically and continually enhanced through MTL state-based analysis techniques. The disclosed techniques can also provide a greater efficiency and control over user file transfer activities for an enterprise. The disclosed techniques can also improve decisions and preventative actions performed in response to network traffic that exceeds a threshold metric (e.g., based on a behavior profile associated with a user). The disclosed techniques can also identify and prevent attackers using compromised credentials to exfiltrate data from an enterprise (e.g., steal data from the enterprise).

Accordingly, various techniques for providing automated insider threat prevention are disclosed. For example, various techniques for providing automated insider threat prevention based on user file transfer application behaviors and activity are disclosed. As will be apparent to one skilled in the art in view of the various techniques and embodiments described herein, the various techniques described herein for providing automated insider threat prevention can similarly be performed using cloud-based security solutions, network device-based security solutions, host-based/agent-based security solutions, and/or virtualized/software-defined networking (SDN)-based security solutions, such as further described below with respect to various embodiments.

A System Architecture of a Network Device for Automated Insider Threat Prevention FIG. 1 is a functional diagram of an architecture of a network device that can be used for providing automated insider threat prevention in accordance with some embodiments. As shown in FIG. 1, network traffic is monitored at a firewall 100. In one embodiment, network traffic is monitored using a network device, such as a data appliance (e.g., a data appliance that includes security functions, such as a security device/appliance that includes a firewall). In one embodiment, network traffic is monitored using a network device, such as a gateway (e.g., a gateway that includes security functions, such as a security gateway). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) and user identifier (ID) engine (e.g., shown as App ID Check & User ID Check component 108 in FIG. 1, which can be implemented as an integrated component or as distinct components in firewall 100). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. A policy check engine 106 determines whether any policies can be applied based on the IP address and port number. As also shown in FIG. 1, an App ID Check & User ID Check 108 identifies an application and a user associated with the monitored network traffic (e.g., session). For example, the application can be identified using an APP-ID engine (108) using various application signatures for identifying applications based on packet flow analysis. The user identification can also be determined based on a source IP address using user ID check engine (108). In this example, the APP-ID engine (108) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to process the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., a decrypt component of firewall 100 for applying trusted man-in-the-middle techniques using a self-signed certificate, such as further described below). A known protocol decoder engine 112 decodes and analyzes traffic flows using known protocols (e.g., a known protocol decoder component of firewall 100 for applying various signatures for the known protocol) and reports the monitored traffic analysis to a report and enforce policy engine 120 (e.g., a report and enforce policy component of firewall 100 for performing reporting and enforcement actions based on a policy, such as further described below). Identified traffic (no decoding required) engine 114 reports the identified traffic to the report and enforce policy engine 120. An unknown protocol decoder engine 116 decodes and analyzes traffic flows (e.g., an unknown protocol decoder component of firewall 100 for applying various heuristics for network traffic using an unknown protocol) and reports the monitored traffic analysis to the report and enforce policy engine 120.

In one embodiment, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies, which can include insider threat prevention (ITP) policies). For example, firewall policies can be applied to the monitored network traffic using application identification, user identification, content identification (e.g., App ID and user ID check component 108 can also include a content ID component as an integrated distinct component of firewall 100, in which the content ID component can provide real-time content scanning, such as for monitoring and/or controlling file transfer activities (including data limits on file transfers and/or destination-based restrictions on such file transfers), such as further described below), and/or other information to match signatures (e.g., file-based, protocol-based, and/or other types/forms of signatures for detecting malware or suspicious behavior).

In one embodiment, firewall 100 also includes a content-ID engine (not shown). In one embodiment, the content-ID engine's identified content is also used by report and enforce policy engine 120, possibly in various combinations with other information, such as application, user, and/or other information, to enforce various security/firewall policies/rules.

In one embodiment, firewall 100 also includes a behavior profiles component 118 and an Insider Threat Prevention (IPT) enforcement component 122 for providing insider threat detection and enforcement using the firewall (e.g., based on file transfer activities by a user that do not match a behavior profile for the user based on a threshold comparison based on one or more metrics), such as further described below. In one embodiment, behavior profiles component 118 can perform a threshold comparison of monitored network communications associated with a user with a behavior profile for the user for providing insider threat prevention using the firewall, such as further described below with respect to various embodiments. For example, a monitored network session can be determined to be a file transfer activity associated with a given user using app ID and user ID check component 108, and the file transfer activity for the user can be compared with a behavior profile for the user using behavior profiles component 118. If the file transfer activity is determined to be an anomalous file transfer activity for the user based on the comparison with the behavior profile for the user (e.g., the file transfer activity does not match the file transfer activities associated with the user and/or exceeds a threshold value with respect to one or more metrics for file transfer activities based on the behavior profile for the user), then firewall 100 can determine a responsive action based on IPT policy 122. These and other examples for providing automated insider threat prevention using behavior profiles and a policy implemented using firewall and/or other techniques, including endpoint agent and cloud security techniques that can be integrated with network device-based firewall techniques, will be further described below.

In one embodiment, various other functional architectures and flows are provided to implement techniques for providing automated insider threat prevention (e.g., including using a firewall and/or other techniques, including endpoint agent and cloud security techniques that can be integrated with network device-based firewall techniques) as described herein. For example, some of these network device-based firewall functions can be implemented in software executed on a general processor and/or some of these functions can be implemented using hardware acceleration techniques for faster packet processing of network traffic, such as further described below.

A Network Architecture for Automated Insider Threat Prevention

Figure 2:
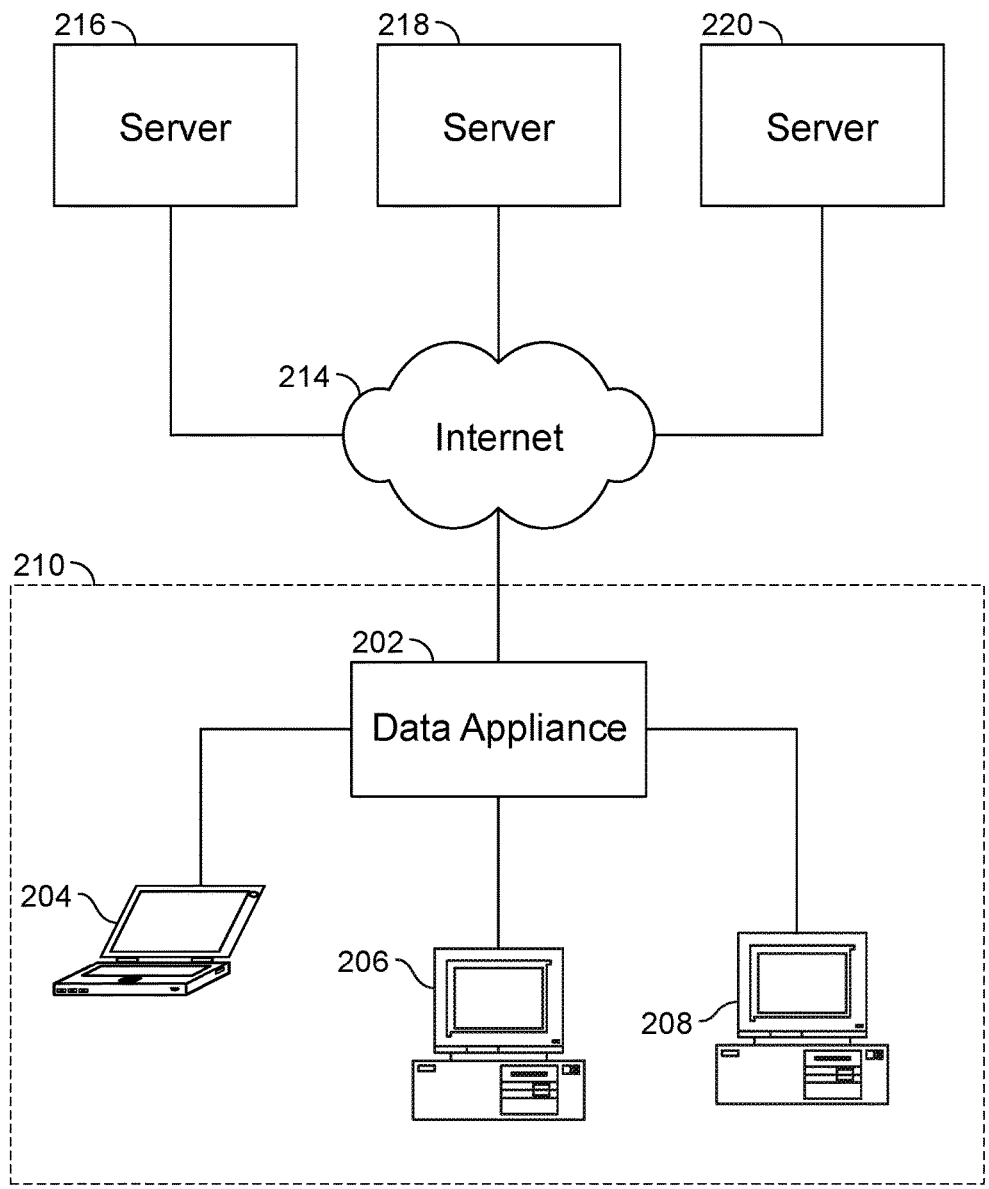
FIG. 2 is a block diagram of a network architecture that can be used for providing automated insider threat prevention in accordance with some embodiments.

FIG. 2 is a block diagram of a network architecture that can be used for providing automated insider threat prevention in accordance with some embodiments. As shown, a data appliance 202 (e.g., a network device that includes security functions, such as a security appliance/device that includes a firewall, a gateway that includes security functions, such as a security gateway, and/or any other network device that includes a firewall function as described herein) is at the perimeter of a protected network 210, which includes clients 204, 206, and 208 (e.g., desktop computers, laptop computers, tablet computers/tablets, smart phones, and/or other types of client devices that can access data on enterprise network 210 using network communications (wired or wireless network communications, and/or can transfer data from the client device and/or other devices on enterprise network 210 to a local storage, such as a portable storage device/USB storage device)).

In one embodiment, data appliance 202 includes a firewall component, such as firewall 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
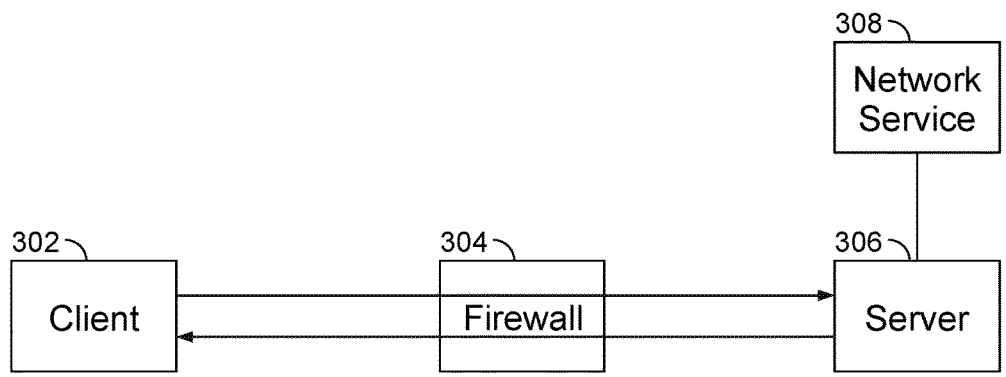
FIG. 3A is a functional block diagram illustrating a typical SSL session passing through a firewall.

Techniques for Decrypting Network Traffic for Automated Insider Threat Prevention FIG. 3A is a functional block diagram illustrating a typical SSL session passing through a firewall. In that session, the firewall can only inspect the handshake traffic, as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes insider threat detection/prevention/enforcement, such as described herein). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
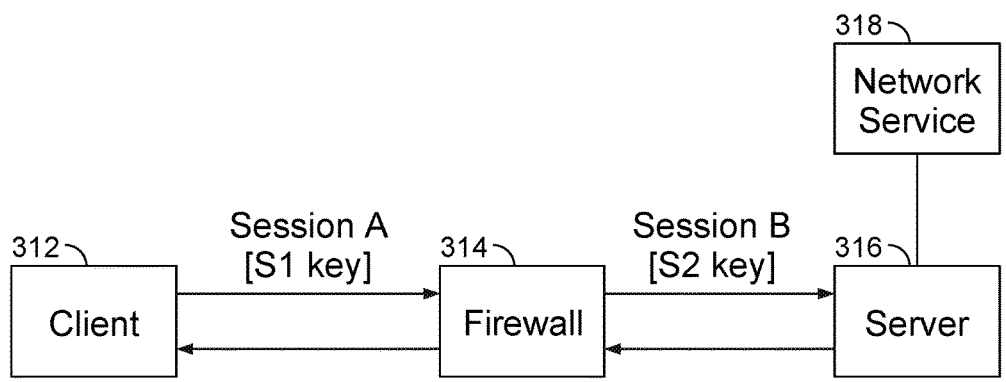
FIG. 3B is a functional block diagram illustrating the use of a firewall for providing automated insider threat prevention in accordance with some embodiments.

FIG. 3B is a functional block diagram illustrating the use of a firewall for providing automated insider threat prevention in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., create an SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., to monitor the session traffic for automated insider threat prevention as described herein, and such session monitoring can be performed for the life of the session, for a predetermined period of time, and/or until a predetermined event occurs, such as an anomalous file transfer activity is detected and a responsive action is performed based on a policy), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques, the firewall 314 is between the client 312 and the server 316 and can present itself as server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing automated insider threat prevention can similarly be applied to other encrypted protocols that support tunneling.

Another Network Architecture for Automated Insider Threat Prevention

Figure 4:
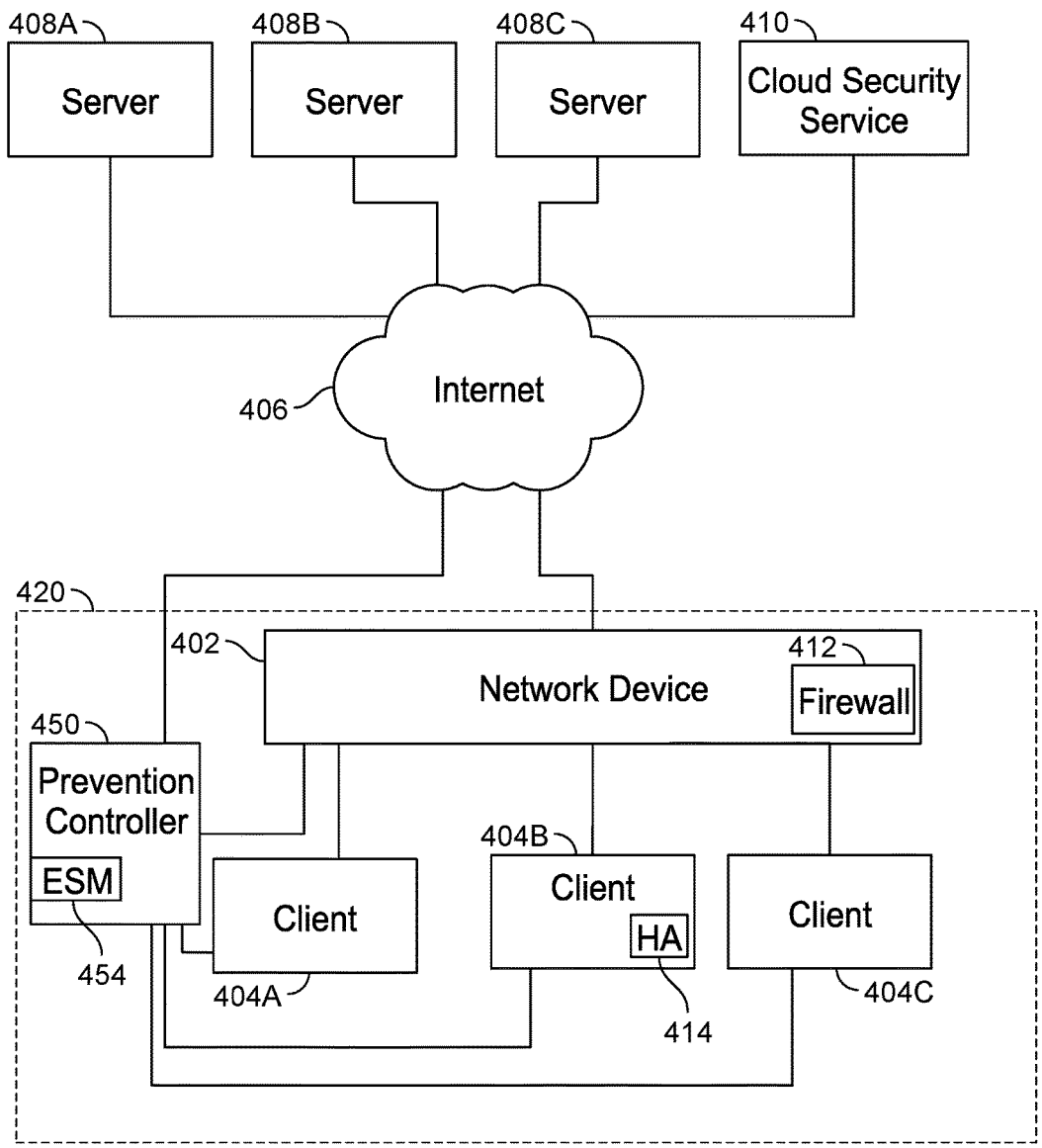
FIG. 4 is a block diagram illustrating another network architecture for providing automated insider threat prevention in accordance with some embodiments.

FIG. 4 is a block diagram illustrating another network architecture for providing automated insider threat prevention in accordance with some embodiments. As shown in FIG. 4, client devices 404A, 404B, and 404C are in communication with the Internet 406 via a network device 402 (e.g., a data appliance, such as similarly described above with respect to FIG. 2). In one embodiment, the network device 402 includes a firewall 412 (e.g., a firewall component that can be implemented in software executed on a hardware processor of the network device, or implemented in hardware at least in part such as similarly described herein, and/or a combination thereof) as shown, which can be used for security for enterprise network 420. In one embodiment, the network device 402 includes a data appliance (e.g., a security appliance), a gateway (e.g., a security server), a server (e.g., a server that executes security software including firewall 412), and/or some other network/security device, which, for example, can be implemented using computing hardware, software, or various combinations thereof.

In one embodiment, one or more of the client devices 404A-404C include a host agent (HA) 414 as shown. For example, HA 414 can be implemented as a host-based firewall and/or an agent, such as a network/security agent, executed on the client/host device (e.g., implemented in software that can be executed on a hardware processor of the client/host device) that can perform various functions in coordination with network device 402, firewall 412, and/or a cloud security service 410 to facilitate endpoint protection and to facilitate the various techniques for providing automated insider threat prevention, such as further described below. In an example implementation, HA 414 can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers) to facilitate endpoint security and automated insider threat prevention in coordination with network device 402, firewall 412, and/or a cloud security service 410, such as further described below.

In one embodiment, network device 402, firewall 412, and/or HA 414 perform some or all of the functions described above with respect to FIGS. 1, 2, and 3B. For example, client devices 404A-C can include various computing devices that can access the Internet via wired and/or wireless communications, such as computers, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service such as web-posting applications, email applications, and/or other file transfer related applications and/or components of applications/web services that perform such web-posting applications, email applications, and/or other file transfer related applications, such as a listing of web-posting applications, email applications, and/or other file transfer related applications and/or components available at https://applipedia.paloaltonetworks.com/ (see the subcategory of web-posting and email components/applications), peer-to-peer related services such as file sharing applications and/or components of applications/web services that perform such file sharing application functions, such as a listing of file sharing applications and/or components available at https://applipedia.paloaltonetworks.com/ (see the subcategory of file-sharing components/applications), IRC services (e.g., chat service), and/or any other file/data transfer/sharing services that can be delivered via the Internet and that can be potentially utilized for data exfiltration)).

In one embodiment, when an HA (e.g., HA 414) is available on a host, client-side inspection and monitoring of applications, such as file transfer related applications, can be performed using the HA, which can provide additional monitoring of user activities to facilitate endpoint security and automated insider threat prevention in coordination with network device 402, firewall 412, and/or a cloud security service 410, such as further described below. In one embodiment, when an HA (e.g., HA 414) is available on a host, client-side inspection and monitoring of user activities on a web site/services can be performed more reliably and inexpensively on the HA (e.g., than may be possible on firewall 412, as it can be performed before any application, web-based, Java-Script-based, plugin-based, or browser-based obfuscation and encryption are applied). In one example, assuming an HA (e.g., HA 414) is executed on a particular host as similarly described above, the firewall (e.g., firewall 412) can implement a policy (e.g., firewall policy) to treat traffic already inspected by the HA from that host as having a lower security risk and only inspects it opportunistically (e.g., based on available firewall/network device resources and/or other parameters).

In some cases, the network device/firewall and/or the cloud security service can also use HA provided summary data and/or verdicts for providing automated insider threat prevention, and/or other activities of interest that can be detected by the HA executed on the client device that are relevant for providing automated insider threat prevention, instead of waiting for traffic to arrive and performing expensive network traffic stream decoding, analysis, and/or app ID, user ID, and/or content extraction.

In addition, the network device/firewall and/or the cloud security service can also use HA provided summary data and/or verdicts for providing automated insider threat prevention, and/or other activities of interest that can be detected by the HA executed on the client device that are relevant for providing automated insider threat prevention, but that are not capable of being independently detected by the network device/firewall and/or the cloud security service. For example, a locally performed file transfer activity that is executed using an application/OS executed locally on the client device to transfer one or more files or other data from the client device to a local device or local storage device may not be detected (in near real-time) without use of a locally executed monitoring agent such as the HA (e.g., the HA can monitor file transfer applications or other file transfer components to detect if a user transfers one or more files or other data from the client device to a local storage device, such as a USB thumb drive, or wirelessly to another storage device or client device, such as using a cellular wireless communication (4G LTE or another cellular communication standard) and/or a short range wireless communication (Bluetooth or another short range wireless communication protocol)).

As also shown in FIG. 4, enterprise network 420 includes a prevention controller 450. In one embodiment, prevention controller 450 includes a data appliance (e.g., a security management appliance), a gateway/server (e.g., a security management server), and/or some other network/security management device, which, for example, can be implemented using computing hardware, software, or various combinations thereof. In some cases, the prevention controller can be integrated with one or more network devices on an enterprise network (e.g., as part of functionality performed in a management plane of network device 402) or can be integrated with other host/network device management devices on the enterprise network. Prevention controller 450 includes an Endpoint Security Manager (ESM) 454 (e.g., ESM 454 can be implemented in software and executed on a hardware processor of prevention controller 450 to facilitate deployment and management of the host agents (endpoint security agents) executed on the client devices, such as HA 414 executed on client 404B, such as further described below) as shown. In one embodiment, prevention controller 450 is an element of an integrated platform for insider threat prevention that facilitates coordination and communications between one or more network devices that include firewalls (e.g., network device 402 and firewall 412), one or more host agents deployed to and executed on client devices (e.g., HA 414 on client 404B), and/or cloud security services (e.g., cloud security service 410) for providing automated insider threat prevention for enterprise networks (e.g., enterprise network 420), as further described below, such as further described below with respect to FIG. 7. In an example implementation, prevention controller 450 and ESM 454 can be implemented using commercially available management solutions available from Palo Alto Networks, Inc., such as Endpoint Security Manager (ESM) servers for management of endpoint security agents (e.g., HA 414) and an ESM console for managing multiple ESM servers.

As will now be apparent, some or all of the functions described above with respect to FIGS. 1, 2, and 3B can be assisted by or implemented in whole or in part by cloud security service 410. Cloud security service 410 can, for example, reduce the processing on the network device 402. As another example, detection of firewall/ITP policy violations based on automated insider threat prevention can be reported to cloud security service 410 by network device 402. In an example implementation, the enterprise network is subscribed to the cloud security service, and the network device can securely communicate with the cloud security service (e.g., using a commercially available cloud-based security service, such as provided by Palo Alto Networks® that provides API support via the WildFire API, such as for submission of files or PCAPs or other content for malware analysis). Another example is using a URL filtering subscription service (e.g., Palo Alto Networks PANdb URL filtering subscription service or another commercially available URL filtering subscription service) to submit one or more URLs (e.g., the submission of a URL, full or part of a web page, statistics/transformed version of a webpage, which can include a list of form field names, types, default values, parameters, etc.) for cloud-based, asynchronous analysis. The results of the cloud-based, asynchronous analysis can then be provided back to the firewall and/or other network/filtering devices for possible responsive actions.

Hardware Components of a Network Device for Automated Insider Threat Prevention

Figure 5:
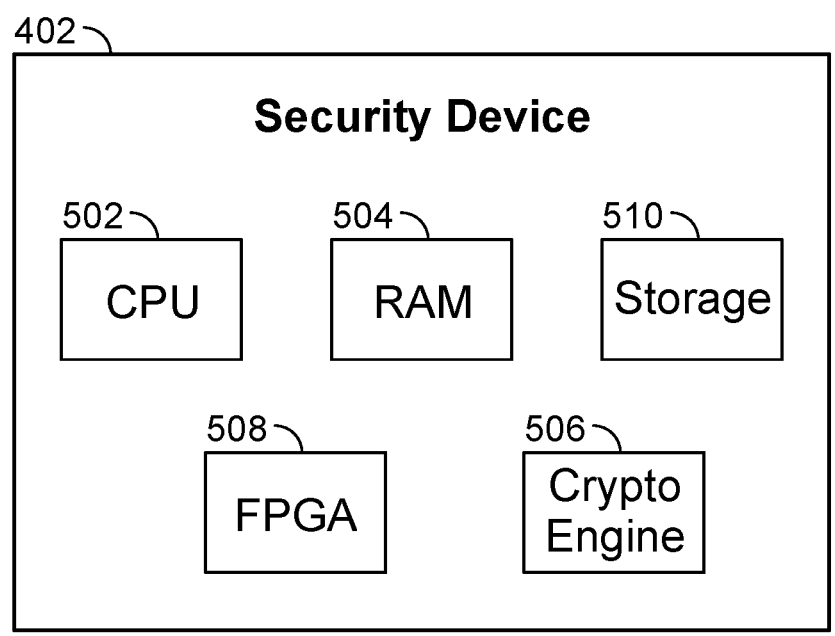
FIG. 5 is a functional diagram of hardware components of a network device for providing automated insider threat prevention in accordance with some embodiments.

FIG. 5 is a functional diagram of hardware components of a network device for providing automated insider threat prevention in accordance with some embodiments. The example shown is a representation of physical/hardware components that can be included in network device 402 (e.g., an appliance, gateway, or server). Specifically, network device 402 includes a high performance multi-core CPU 502 and RAM 504. Network device 402 also includes a storage 510 (e.g., one or more hard disks or solid state storage units), which can be used to store policy and other configuration information as well as signatures. In one embodiment, storage 510 stores tables that include host names/identifiers (e.g., URLs) and associated IP addresses and possibly other information for clients and/or remote servers identified as external sites (e.g., sites that are associated with file transfer activities and/or other web services related activities that may be of interest based on a firewall/ITP policy) that are monitored for providing automated insider threat prevention. In one embodiment, storage 510 stores a behavior profiles cache that includes behavior profiles for enterprise users on an enterprise network (e.g., a behavior profile can include one or more metrics for file transfer related behaviors associated with a user and/or other behavior related data that can be stored in various formats using various techniques such as described herein), such as further described below. Network device 402 can also include one or more optional hardware accelerators. For example, network device 402 can include a cryptographic engine 506 configured to perform encryption and decryption operations, and one or more FPGAs 508 configured to perform signature matching, act as network processors, and/or perform other tasks.

Logical Components of a Network Device for Automated Insider Threat Prevention

Figure 6:
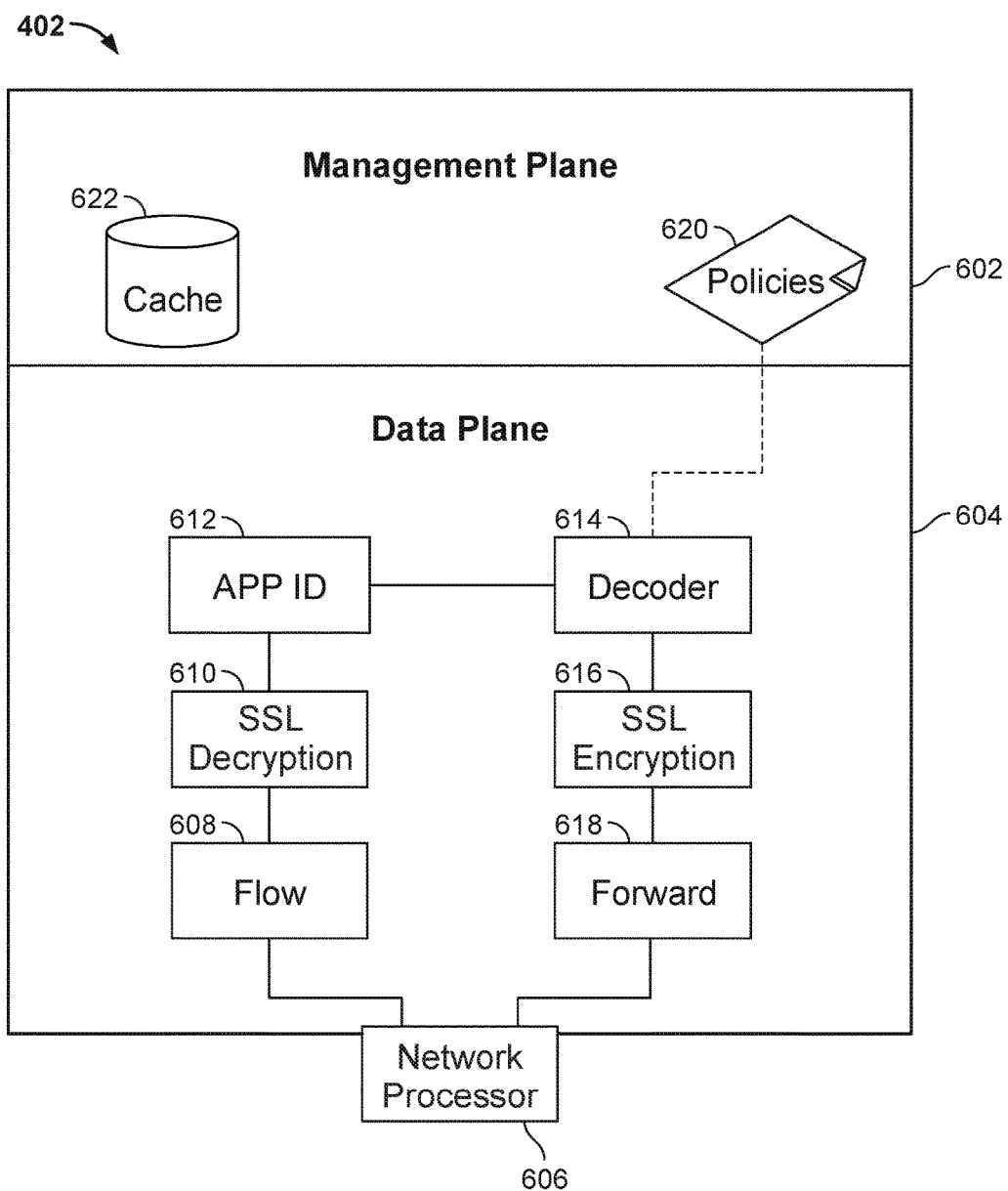
FIG. 6 is a functional diagram of logical components of a network device for providing automated insider threat prevention in accordance with some embodiments.

FIG. 6 is a functional diagram of logical components of a network device for providing automated insider threat prevention in accordance with some embodiments. The example shown is a representation of logical components that can be included in network device 402. As shown, network device 402 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 (e.g., as similarly described above with respect to decrypt component 110 of FIG. 1) using various techniques as described herein. Otherwise, processing by SSL decryption engine 610 is omitted. Application identification and user identification (APP ID) module 612 is configured to determine what type of traffic the session involves and to identify a user associated with the traffic flow for providing app/user control and content control for performing the disclosed techniques for automated insider threat prevention (e.g., as similarly described above with respect to App ID and User ID check component 108 of FIG. 1). For example, APP ID 612 can recognize a GET request in the received data and conclude that the session requires an HTTP decoder. For each type of protocol, there exists a corresponding decoder 614 (e.g., as similarly described above with respect to network traffic processing components 112, 114, and 116 of FIG. 1). In one embodiment, the application identification is performed by an application identification module (e.g., APP-ID engine/component), a user identification is performed by another function/component, and/or a content identification is performed by yet another function/component. Based on the determination made by APP ID 612, the packets are sent to an appropriate decoder 614. Decoder 614 is configured to assemble packets (e.g., which may be received out of order) into the correct order, perform tokenization, and extract out information (e.g., to extract URLs and/or to identify and extract username/password credentials being submitted to an external site for user authentication). Decoder 614 also performs signature matching to determine what should happen to the packet. SSL encryption engine 616 performs SSL encryption using various techniques as described herein. Packets can be forwarded using forward component 618. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for providing automated insider threat prevention as disclosed herein) is applied as described herein with respect to various embodiments based on the monitored, decrypted, identified, and decoded session traffic flows.

As also shown in FIG. 6, a cache 622 (e.g., a behavior profiles cache) is also provided for maintaining behavior profiles for users that can be used to implement the disclosed techniques for automated insider threat prevention as will be further described below. For example, the behavior profiles cache can be maintained in the management plane and/or the data plane of the network device.

Prevention Controller for Automated Insider Threat Prevention

Figure 7:
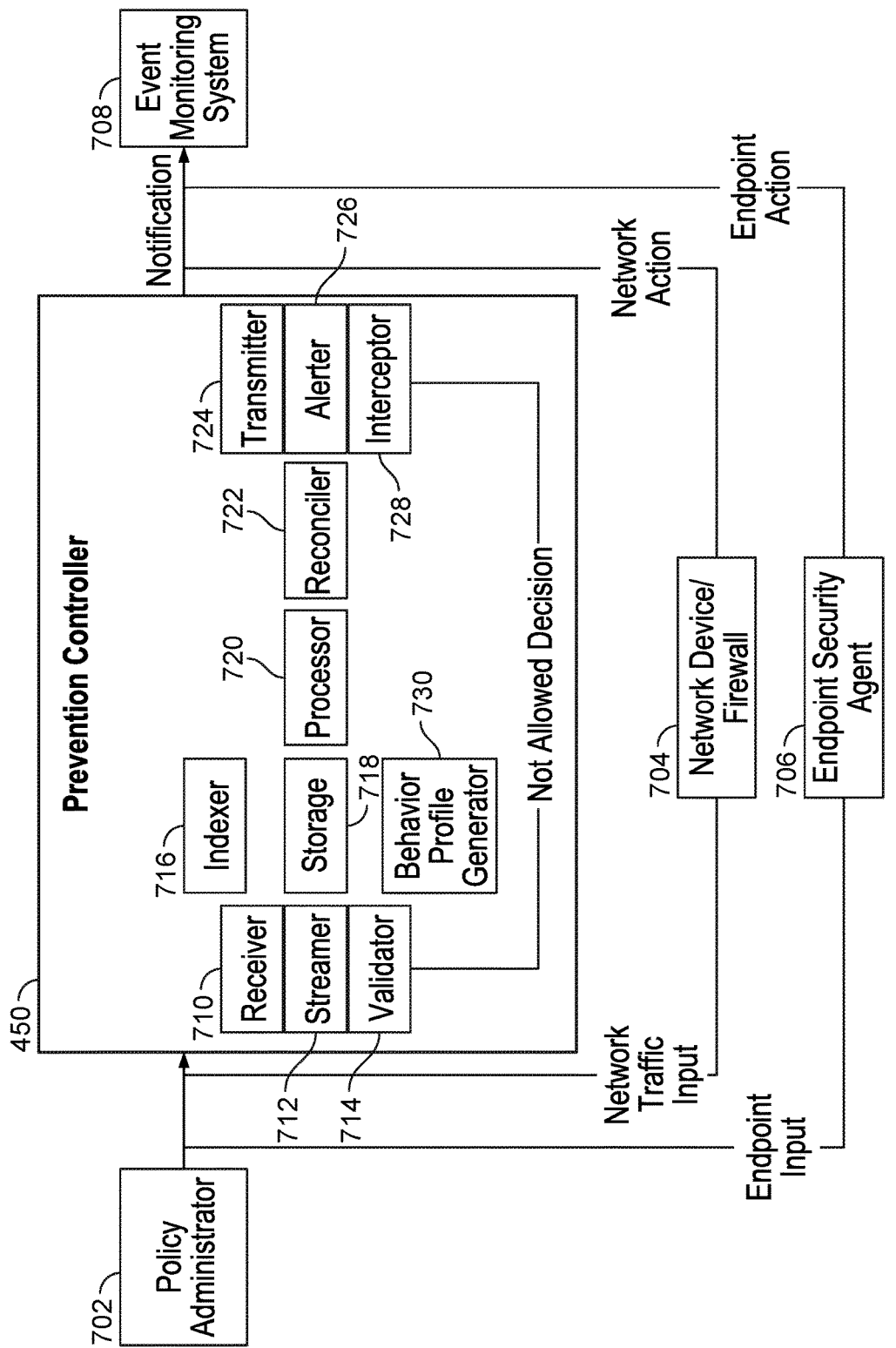
FIG. 7 is a functional diagram of components of a prevention controller of an integrated platform for providing automated insider threat prevention in accordance with some embodiments.

FIG. 7 is a functional diagram of components of a prevention controller of an integrated platform for providing automated insider threat prevention in accordance with some embodiments. In one embodiment, prevention controller 450 is an example component diagram of the prevention controller as shown in FIG. 4 and can perform the functions described above with respect to FIG. 4 and as further described herein.

For example, the prevention controller can receive and store input from a policy administrator 702 (e.g., an IT/network/security admin can utilize a policy administrator interface, such as a graphical user interface (GUI) and/or programmatic/command line interface (CLI) to create, modify, delete or otherwise specify/configure a policy, such as a policy for insider threat prevention (ITP policy)), network traffic input from network device(s)/firewall(s) (e.g., network device/firewall 704 as shown in FIG. 7 and network device 402/firewall 412 as shown in FIG. 4), and/or endpoint agent input from endpoint security agent(s) (e.g., endpoint security agent 706 as shown in FIG. 7 and HA 414 as shown in FIG. 4), process the input to make a determination/decision, execute an action/response (e.g., which can utilize a network device/firewall to perform a network action and/or an endpoint security agent to perform an endpoint action, as also shown in FIG. 7), and generate an alert/notification to event monitoring systems (e.g., event monitoring system 708 as shown in FIG. 7).

In one embodiment, the policy administrator can be used to create policies (e.g., firewall/ITP policies) for the prevention controller, which is in communication and coordination with an integrated platform that includes the one or more network devices/firewalls on the enterprise network as well as the one or more endpoint security agents associated with the enterprise network and, in some cases, a cloud security service (e.g., cloud security service 410; the cloud security service is not shown in FIG. 7). In an example implementation, the policy administrator can be implemented as a distinct component/server or can be implemented as an integrated component of the prevention controller.

As similarly described above, network device/firewall 704 can provide network inputs (e.g., based on monitored network communications on an enterprise network) and execute actions based on the monitored network communications and a policy (e.g., a firewall/ITP policy). As also similarly described above, endpoint security agent 706 can provide endpoint inputs (e.g., based on monitored endpoint activities on a client device associated with an enterprise network) and execute actions on the endpoint/client device based on the monitored endpoint activities and a policy (e.g., a firewall/ITP policy).

For example, the event monitoring system(s) can be used to monitor events/notifications received from the prevention controller, the one or more network devices/firewalls on the enterprise network, and the one or more endpoint security agents associated with the enterprise network. In an example implementation, the event monitoring system can be implemented as a distinct component/server or can be implemented as an integrated component of the prevention controller.

Referring to FIG. 7, prevention controller 450 includes the following components as shown in FIG. 7 for performing the prevention controller functions: a receiver 710, a streamer 712, a validator 714, an indexer 716, a storage 718, a processor 720, a reconciler 722, a transmitter 724, an alerter 726, an interceptor 728, and a behavior profile generator 730. In an example implementation, each of these components can be implemented in software (e.g., implemented using one or more high-level programming language, such as Java, JavaScript, Python, C++, C#, or another high-level programming language) and executed on a hardware processor of a data appliance or other computing/network device (e.g., a server, gateway, appliance, or other network device).

Each of the components of prevention controller 450 shown in FIG. 7 will now be further described in accordance with one embodiment. Receiver 710 receives input from one or more network devices/firewalls (e.g., network communications/traffic input associated with network device/firewall 704 as shown in FIG. 7) and receives input from one or more endpoint security agents (e.g., endpoint input associated with endpoint security agent 706 as shown in FIG. 7). Streamer 712 handles stream input (e.g., any communications input outside explicitly not-allowed/disallowed policies). Validator 714 validates activity is explicitly not allowed (e.g., an activity, such as a file transfer activity or other activity, that is not allowed/disallowed under a given policy/ITP policy). Indexer 716 indexes activity of streamer 712 and validator 714. Storage 718 stores (e.g., caches) activity of streamer 712 and validator 714. Processor 720 processes activity from streamer 712 to a determined state. Storage 718 or another storage/cache of prevention controller 450 can also store behavior profiles for users/groups of users, such as described herein. Reconciler 722 correlates activity state information from processor 720 to determine a threshold deviation (e.g., as compared with a behavior profile for the user associated with the activity) and then determines an action based on a result of the threshold deviation. Transmitter 724 transmits outputs to event monitoring system(s) 708, network device(s)/firewall(s) 704, and endpoint security agent(s) 706. Alerter 726 provides alerts to event monitoring system(s) 708 (e.g., various commercially available event monitoring systems). Interceptor 728 directs an action by network device(s)/firewall(s) 704 (e.g., block a disallowed network communication/session) and/or endpoint security agent(s) 706 (e.g., kill a disallowed process on the endpoint device) to control and prevent unwanted activity or threshold deviations as shown in FIG. 7 (e.g., a not allowed decision from validator 714 and/or a not allowed decision resulting from processor 720 and reconciler 722 determined for an activity based on a threshold deviation as similarly described above).

In an example implementation, receive and transmit communications to and from the prevention controller can be encrypted using a standard encryption protocol (e.g., SSL or another standard encryption protocol). These receive and transmit communications to and from the prevention controller can also be specified in a defined format/data structure for compatible/interoperable communications with various compliant event monitoring system(s) 708, network device(s)/firewall(s) 704, and endpoint security agent(s) 706.

In an example implementation, policies (e.g., specified using a policy administrator 702, such as by an IT/network/security administrator) can include various stages, such as creation, staging, activation, deactivation, and/or deletion. These policies can be specified activities (e.g., based on metrics and/or activity state information) that can be allowed, disallowed, or determined to be allowed or disallowed based on threshold deviation(s) for one or more metrics (e.g., disallow file transfer activities for a specified user/group of users that exceed 10 MB or some other maximum amount of data to an external site/specified external site(s) within a predetermined time period such as 24 hours or some other time period). Example policies (e.g., ITP policies) are further described below.

In an example implementation, execution of the integrated platform for automated insider threat prevention can include executing actions/orders from network device(s)/firewall(s) 704, endpoint security agent(s) 706, and/or alerter 726 orders from prevention controller 450 as shown in FIG. 7 and as similarly described above. Validation of such orders/actions can be performed by network device(s)/firewall(s) 704, endpoint security agent(s) 706, and/or validator 714 of prevention controller 450 as shown in FIG. 7 and as similarly described above.

In an example implementation, alerting can include providing a notification, such as to event monitoring system(s) 708, network device(s)/firewall(s) 704, endpoint security agent(s) 706, specified users (e.g., sending electronic notifications to an IT/network/security administrator(s), such as via electronic mail, an SMS/text message, and/or other electronic communications can be provided), and/or other devices/components/entities. In some cases, such notifications can include a priority and/or be communicated based on priority, and such notifications may also request/require an acknowledgement and/or forwarding.

In one embodiment, a behavior profile generator is provided using prevention controller 450 as shown with behavior profile generator 730 in FIG. 7, using a cloud security service (e.g., cloud security service 410 of FIG. 4), and/or using a combination of the cloud security service and the prevention controller 450. For example, the behavior profile generator can create and/or update (e.g., modify/tune) behavior profiles using the disclosed techniques, such as further described below. In an example implementation, behavior profile generator 730 is a component of prevention controller 450 that can generate and/or modify behavior profiles for users and/or groups of users based on monitored activities associated with users. For example, file transfer activities associated with users (e.g., specific users and/or based on user groups) can be monitored using network device(s)/firewall(s) 704 and endpoint security agent(s) 706 as shown in FIG. 7 to generate and/or modify a behavior profile(s) based on the monitored file transfer activities associated with the enterprise users. As an example, if Alice is an enterprise user, and monitoring of Alice's file transfer activities indicates that Alice commonly uses Gmail and Dropbox for file transfer related activities but has not been observed using Yahoo or Box, then a behavior profile based on monitored file transfer activities associated with Alice can be generated and/or modified using behavior profile generator 730 to include a metric(s) of a normal file transfer activity for Alice as being associated with using Gmail and Dropbox but any usage of Yahoo or Box would not be indicated as normal file transfer activity for Alice. As further described below, behavior profile generator 730 can be implemented using various data mining techniques, such as using one or more machine learning techniques, for normal behavior state determination.

Data Mining Techniques for Normal Behavior State Determination

In one embodiment, automated insider threat prevention performs one or more data mining techniques to determine normal behavior (e.g., state behavior) of users based on an input stream, such as the above-described example inputs for monitoring for insider threats based on file transfer activities to determine whether such may be data exfiltration attempts based an insider attack by an insider with malicious intent or based on an outsider attack by an outsider with compromised/stolen credentials of an authorized user. For example, clustering and classification modeling are examples of data mining techniques that can be implemented to determine normal behavior (e.g., state behavior) of users based on such an input stream. These data mining techniques are not mutually exclusive but complementary in nature. There are several known clustering methods, such as Kohonen Self-Organizing Maps (SOM); and also a variety of classification methods, such as decision trees. By applying a clustering methodology, a baseline of expected behavior can be developed for one or more segments.

As an example, neural network segmentation can efficiently and effectively perform such normal behavior determinations as such can use structured or unstructured data, such as a variety of numeric and text inputs. In this example, each segment can exhibit characteristics based on one more data points, inputs, and flows. In an example implementation, segments can be composed of individual data points or streams, such as one or more of the following: individual users, applications, file types, job titles, job roles, departments, geographies, computer signatures (e.g., unique identifiers for client devices), usage patterns over time for any of the above, system parameters, radio frequency (RF) radiation characteristics and signatures, standardized telemetry, and other data points or streams. These data points can be selected in advance of the clustering operation(s), using yet another method, such as factors analysis. Factors analysis can reveal the optimum subset of data points to cluster or classify for one or more outcomes. For example, an analyst may have several hundred different data feeds available. The source, nature, format, quality, consistency, reliability, frequency, variation, and population of each field can impact its usefulness in a clustering or classification model. Factors analysis reveals which of the many data feeds will produce the best/optimal results with the least cost or processing overhead. In other words, these techniques can be applied to determine which data feeds produce the highest return on effort. The advantages to creating clusters, composed of similar applications, job titles, and job roles, as described above, is that in practice this can produce faster response times in detection and adjustable tolerances for groups of users, thus reducing the tendency to over-fit a model. If models are over-fit or unnecessarily complex, undesirable results can occur, such as producing poorer predictive scoring and reduced gains performance. Models that are over-fit can also take longer to process, and in the case of identifying abnormal behavior, could mean the difference between preempting a threat in time, or reducing network traffic, thus, adversely impacting an organization's productivity.

For example, applying such methods of clustering, such as Kohonen SOM or neural network segmentation, and classification, such as decision trees and regression models are not mutually exclusive and can often be complementary and produce a net benefit above and beyond using either clustering or classification. Decision trees for example, can be designed to classify threats or traffic patterns in such a way as to enhance discrimination and produce both numeric scores for adjusting tolerances or output segment names or a combination of segment names and a segment score. The scores a model outputs can also be customized to produce an ideal result, for example, applying the most frequently calculated segment or the highest segment ratio.

With both clustering and classification methods, models can be built on historic data, so that the resulting model can then be implemented in (near) real-time through stored procedures, Predictive Modelling Markup Language (PMML), SQL rules, or other in-state memory deployments. The benefit of this is that of speed and incremental fine-tuning of any model to achieve the ideal output, expressed via gains charts or higher-performing confusion matrices (e.g., examples of two common methods to measure the efficacy of a given model).

While various data mining techniques based on clustering and/or classification to determine normal behavior (e.g., state behavior) of users based on an input stream are described above, various other data mining techniques can be applied to similarly determine normal behavior (e.g., state behavior) of users based on an input stream, as will now be apparent to one of ordinary skill in the art based on the disclosed embodiments.

Integrated Platform for Automated Insider Threat Prevention

Figure 8:
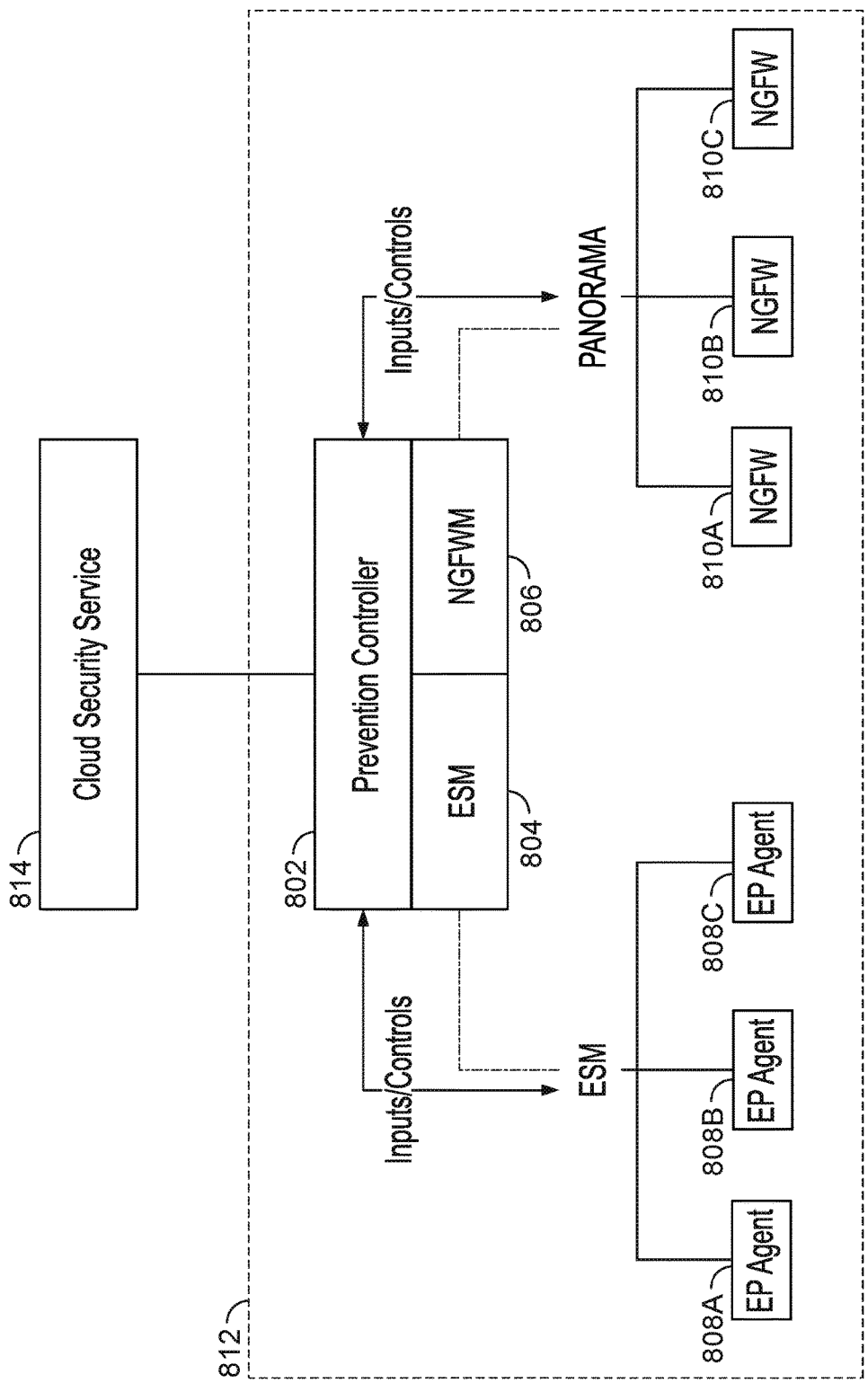
FIG. 8 is a functional diagram of a network architecture of the integrated platform for providing automated insider threat prevention in accordance with some embodiments.

FIG. 8 is a functional diagram of a network architecture of the integrated platform for providing automated insider threat prevention in accordance with some embodiments. In one embodiment, prevention controller 802 can be implemented as similarly described above with respect to the component diagram of prevention controller 450 as shown in FIG. 4 and can perform the functions described above with respect to FIG. 4 and as further described below.

Referring to FIG. 8, an enterprise network 812 includes a prevention controller 802. Prevention controller 802 includes or is integrated with an Endpoint Security Manager (ESM) 804 for managing endpoint (EP) agents 808A, 808B, and 808C (e.g., endpoint security agents, such as endpoint security agent 706 as shown in FIG. 7 and HA 414 as shown in FIG. 4). In an example implementation, the ESM can be implemented as a distinct component/server or can be implemented as an integrated component of the prevention controller. For example, the ESM can be implemented using commercially available management solutions available from Palo Alto Networks, Inc. or other commercially available management solutions, such as Endpoint Security Manager (ESM) servers for management of the endpoint security agents and an ESM console for managing multiple ESM servers, such as similarly shown in FIG. 8.

Prevention controller 802 also includes or is integrated with a Network Gateway FireWall Manager (NGFWM) 806 for managing Network Gateway FireWall (NGFW) devices 810A, 810B, and 810C (e.g., network devices/firewalls, such as network device/firewall 704 as shown in FIG. 7 and network device 402/firewall 412 as shown in FIG. 4). In an example implementation, the NGFWM can be implemented as a distinct component/server or can be implemented as an integrated component of the prevention controller. For example, the NGFWM can be implemented using commercially available management solutions available from Palo Alto Networks, Inc. for managing multiple network devices/firewalls (e.g., NGFWs as shown in FIG. 8), such as the Panorama™ network security management for centralized device management that enables users to centrally manage the process of configuring network devices, deploying security policies, performing forensic analysis, and generating reports across an entire network of next-generation firewalls (e.g., available as either a virtual appliance or a dedicated management platform). For instance, the NGFWM can be implemented using commercially available management solutions available from Palo Alto Networks, Inc. or other commercially available management solutions, such as NGFWM servers for management of the network devices/firewalls and an NGFWM console for managing multiple network devices/firewalls, such as similarly shown in FIG. 8.

As also shown, prevention controller is in communication with cloud security service 814. For example, cloud security service 814 can provide similar integration and coordination as similarly described above with respect to cloud security service 410 of FIG. 4 and as further described below. In an example implementation, the cloud security service can be implemented using a commercially available security service, such as the WildFire™ cloud-based malware analysis environment provided by Palo Alto Networks®.

In one embodiment, the integrated platform for automated insider threat prevention facilitates synchronized and automated insider threat prevention in an enterprise network and on endpoints associated with the enterprise network. For example, the disclosed platform can provide for automated insider threat prevention that can extend across the enterprise network, including both internal as well as mobile users and devices (e.g., authenticating/accessing the enterprise network can result in/require that an endpoint agent be deployed to the mobile device using well-known techniques).

For example, the integrated platform for automated insider threat prevention facilitates synchronized and automated insider threat prevention in an enterprise network and on endpoints associated with the enterprise network by performing application and user control-based monitoring and analysis to implement various policies (e.g., ITP policies) for automated insider threat prevention. As further described below, the disclosed techniques can prevent unknown threats and automatically push protection responses/actions globally to network devices and endpoints as well as to prevent threats through evasive applications or encrypted communications (e.g., SSL or other encryption protocols can be decrypted to monitor such network traffic/communications, such as similarly described above with respect to FIG. 3B). The disclosed techniques can protect the enterprise network and associated endpoints from various zero day and unknown malware threats.

In some cases, the integrated platform for automated insider threat prevention is also in communication with a cloud security service that provides integrated cloud security intelligence to facilitate automated insider threat prevention across the enterprise network, including network devices and endpoints associated with the enterprise network. As such, the disclosed techniques facilitate automated insider threat prevention across all threat vectors everywhere across the enterprise network.

As an example, the integrated platform for automated insider threat prevention can be implemented to identify and prevent intended and unintended insider threat activity using the various techniques described herein. In addition, the disclosed techniques for automated insider threat prevention can be implemented utilizing various MLTs (e.g., executed on the prevention controller and/or the cloud security service to generate, train, and update/enhance behavior profiles for automated insider threat prevention, such as further described below) that can continue to enhance intelligence for protecting the enterprise network from various insider threats.

Also, the disclosed techniques for automated insider threat prevention can provide more efficiency and control of user file transfer activities to safeguard against various intended and unintended insider threat activity. As an example, decisions and prevention/responsive actions can be performed in network traffic (e.g., using a network device/firewall) when monitored network traffic behavior exceeds a threshold based on one or more metrics and/or can be performed on an endpoint (e.g., using an endpoint security agent) when monitored endpoint behavior exceeds the threshold based on one or more metrics. In some cases, these disclosed techniques can identify and prevent attackers from using compromised credentials to exfiltrate data (e.g., steal data) from the enterprise (e.g., from one or more devices/ elements of the enterprise network).

Example Use Case Scenarios for Automated Insider Threat Prevention

Figure 9:
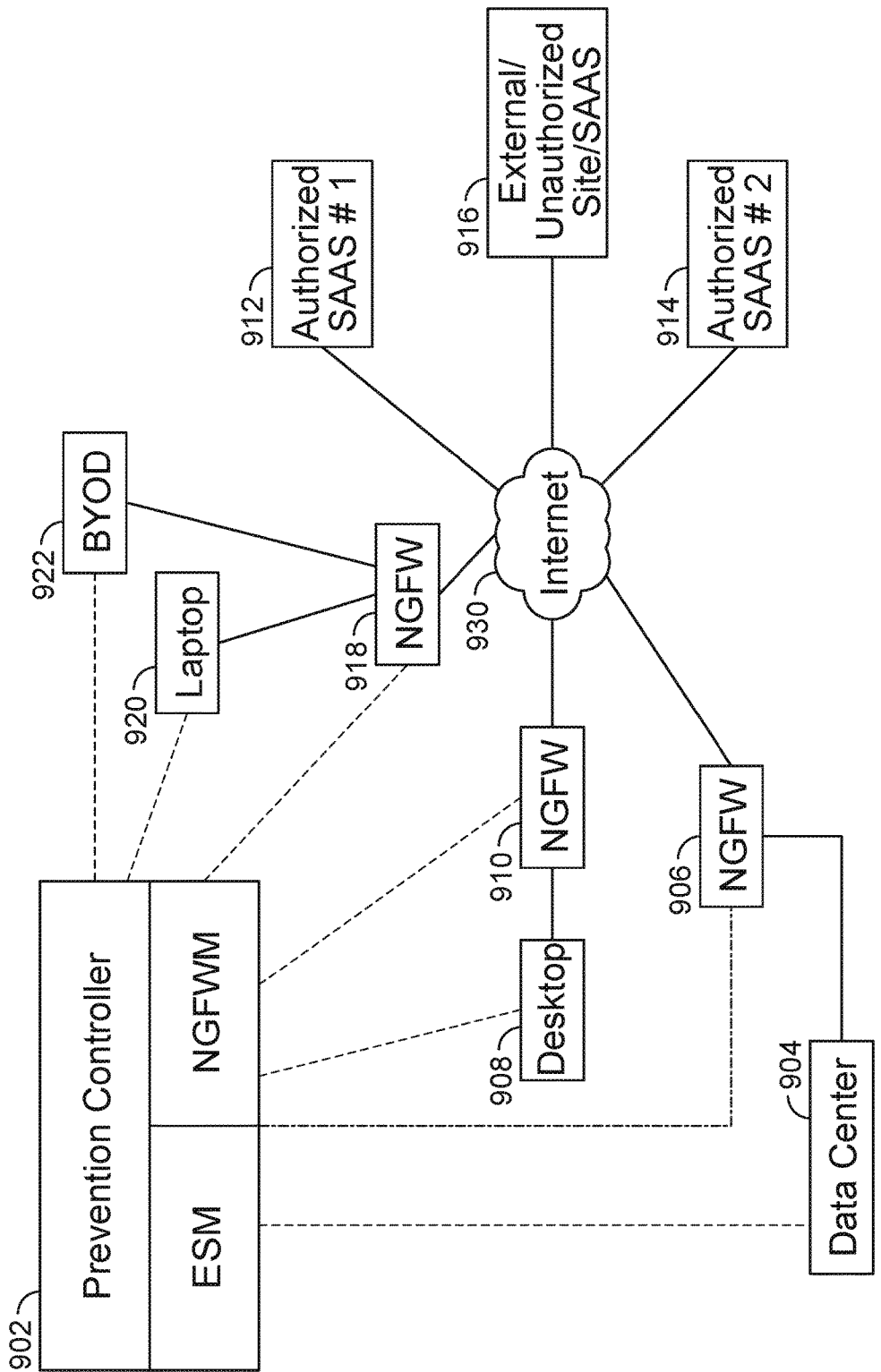
FIG. 9 is a functional diagram illustrating use cases for the integrated platform for providing automated insider threat prevention in accordance with some embodiments.

FIG. 9 is a functional diagram illustrating use cases for the integrated platform for providing automated insider threat prevention in accordance with some embodiments. In one embodiment, prevention controller 902 can be implemented as similarly described above with respect to the component diagram of prevention controller 802 as shown in FIG. 8, respectively, and can perform the functions described above and as further described below.

Referring to FIG. 9, an enterprise network includes a prevention controller 902. Prevention controller 902 includes or is integrated with an ESM for managing endpoint (EP) agents (e.g., endpoint security agents, such as endpoint security agent 706 as shown in FIG. 7 and HA 414 as shown in FIG. 4, which can be deployed on various endpoints, such as desktop 908, laptop 920, and bring your own device/mobile device 922 as shown in FIG. 9). Prevention controller 902 also includes or is integrated with an NGFWM for managing network devices/firewalls (e.g., network devices/firewalls, such as network device/firewall 704 as shown in FIG. 7 and network device 402/firewall 412 as shown in FIG. 4, which can be implemented using NGFWs, such as NGFWs 906, 910, and 918 as shown in FIG. 9). As also shown, the enterprise network includes a data center 904 that is in communication with prevention controller 902 and NGFW 906. In this example, data center 904 and endpoints/client devices 908, 920, and 922 are in communication with Internet 930 via NGFWs 906, 910, and 918 as shown in FIG. 9. For example, as further described below with respect to various use case scenarios, various external sites, such as authorized SAAS #1 912, authorized SAAS #2 914, and external/unauthorized site/SAAS 916 are accessible via Internet 930.

Assume that an enterprise network for ACME Company includes prevention controller 902, data center 904, endpoints/client devices 908, 920, and 922, and NGFWs 906, 910, and 918. Also, assume that SAAS #1 912 and SAAS #2 914 are authorized software as a service (SAAS) providers/ external sites for enterprise/authorized users of ACME Company, and external/unauthorized site/SAAS 916 is not an authorized SAAS provider or external site for enterprise/ authorized users of ACME Company (e.g., Box.com and Salesforce.com can be example authorized SAAS providers and example-domain.com can be an example of an external/ unauthorized web site/SAAS provider). The enterprise/authorized users of ACME Company can access Internet 930 from client devices to access various external web sites (sites) and/or SAAS provider sites and/or can also access data center resources 904 (e.g., in which such communications would similarly pass through a respective NGFW for the user's client device), such as shown in FIG. 9. As also shown in FIG. 9, each of the client devices communicate over the Internet via an NGFW that is managed by prevention controller 902 (e.g., using an NGFWM component of prevention controller 902, such as similarly described above with respect to FIG. 8), and such client devices are also managed by prevention controller 902 (e.g., using an ESM component of prevention controller 902, such as similarly described above with respect to FIG. 8, in which each of such endpoints/client devices have an endpoint security agent, such as similarly described above with respect to FIGS. 4, 7, and 8). As such, in this example, the network and computing infrastructure of the enterprise network for ACME Company is protected by an integrated platform for insider threat protection using the disclosed techniques, such as further described below.

Referring to FIG. 9, each of the dashed lines represent communications that can include inputs (e.g., input streams) from endpoint security agents executed on each of the client devices to prevention controller 902 and inputs (e.g., input streams) from NGFWs to prevention controller 902, which can be utilized by prevention controller 902 for performing the disclosed insider threat prevention techniques, such as further described below. In this example, for purposes of the use cases to be further described below, assume that the inputs can include the following, but can also include additional inputs for these or other use cases: user identification (ID), file transfer application (app ID), file size, number of file transfers, destination for a file transfer, file type, and file name. For example, the endpoint security agents and/or NGFWs can provide these inputs using the various techniques described above. In this example, the integrated platform for automated insider threat prevention can provide a constant, consistent, verified, and high integrity stream with these inputs per user, which facilitates a vantage point to identify and prevent insider threats that stem from unintentional or intentional user actions.

As a result, prevention controller 902 can receive and process the input data from the input stream to capture user behavior in a stateful manner. The stateful manner allows prevention controller 902 to make determinations/decisions about unwanted, malicious, or suspicious user behavior indicative of an actual or potential insider threat efficiently and effectively (e.g., with greater granularity, in near real-time, and with enhanced accuracy (lower false positive risks)). In an example implementation, the determinations/ decisions allow prevention controller 902 to monitor tailored thresholds, per user, and actively request/perform responsive actions in network traffic (e.g., by instructing responsive actions to be performed by network devices/firewalls, such as to drop a session to an external site or block communications to an external site, etc.) or on endpoints (e.g., by instructing responsive actions to be performed by endpoint agents, such as to kill a process or block execution of an application, etc.) to mitigate threats immediately (e.g., in near real-time). The integrated platform facilitates a fully automated solution for insider threat protection (e.g., prevention and control) throughout ACME's enterprise network by integrating prevention controller 902 with the NGFWs and endpoints.

As a first use case scenario, assume that user credentials for Alice have been compromised or stolen by an unauthorized user/attacker (e.g., the unauthorized user/attacker has gained access to Alice's username and password for access to Alice's client device(s) on the enterprise network), and the unauthorized user/attacker has malicious intent to exfiltrate data from ACME's enterprise network. As a second use case scenario, assume that Bob is an inside attacker with malicious intent to exfiltrate data from ACME's enterprise network.

For both use case scenarios, prevention controller 902 can identify normal stateful behavior in each of the following options, per user. Examples of file transfer activities that can be monitored can include the following: (1) file transfers using a local application on an endpoint (e.g., an application executed on the user's client device); file transfers to an external site/SAAS provider; and (3) file transfers to a local device/storage device (e.g., transfers of files to a USB storage device, such as a USB thumb drive). As similarly described above, prevention controller 902 can include behavior profiles for each of the users, including Alice and Bob, which provide metrics for such file transfer activities that can be utilized to determine whether monitored file transfer activities are normal behavior for such users. Also, prevention controller 902 can also be configured with a policy that specifies acceptable (e.g., whitelisted) and/or never acceptable (e.g., blacklisted) behaviors (e.g., file transfer activities for all users/group(s) of users can be whitelisted for authorized SAAS#1 912 and/or authorized SAAS#2 914, and file transfer activities for all users/group(s) of users can be blacklisted for external/unauthorized site/SAAS provider 916). As such, prevention controller 902 can be configured to implement two types of policies, per user or group of users: (1) behavior policies based on user normal behavior (e.g., relative to past and/or expected/acceptable behavior); and (2) active prevention policies not allowed by any user or any user in a given user group at any time.

As similarly discussed above, behavior profiles (e.g., behavior policies) can be generated and/or applied/implemented on a per user basis. A given file transfer application/activity can be approved for a user or group of users as an allowed file transfer application/activity, such that no alert or other responsive action would be performed for such users when monitored using such file transfer application/activity. In this example, authorized SAAS #1 912 and authorized SAAS #2 914 can be added to behavior profiles for users Alice and Bob as allowed file transfer applications/activities (e.g., both Alice and Bob are allowed to transfer files using/to the external sites of authorized SAAS #1 912 and authorized SAAS #2 914). In this case, the behavior profiles (e.g., behavior policies) for each of Alice and Bob can be configured to allow and not generate any alerts (e.g., or other responses/actions) if Alice or Bob perform file transfer activities using/to the external sites of authorized SAAS #1 912 and authorized SAAS #2 914.

In another example, the behavior profiles (e.g., behavior policies) can be configured to control user file transfer activities based on one or more metrics/criteria (e.g., file transfer related usage restrictions) for one or more file transfer applications/activities. In this case, the behavior profiles (e.g., behavior policies) can include restrictions to cap a data transfer size to, for example, two MB per file transfer activity/session or some other cap per activity/session, and cap a total amount of data transfers to, for example, 10 MB within a two hour time period or some other cap and time period, for specified (or all) file types for any external sites (e.g., external destinations, such as external/unauthorized site/SAAS 916). Thus, each of the behavior profiles for Alice and Bob can be configured to include such default/enterprise-based restrictions for such file transfer activities. In this case, for example, if Alice attempts to transfer more than a two MB file to external/unauthorized site/SAAS 916, then prevention controller 902 can block network traffic associated with that session (e.g., using NGFWM to control an NGFW that is monitoring Alice's session associated with that file transfer activity), kill a transfer file thread/process on Alice's client device (e.g., using ESM to control an endpoint security agent on Alice's endpoint being used for that file transfer activity), generate an alert (e.g., using alerter 726 of the prevention controller as shown in FIG. 7), and/or perform some other response based on a policy (e.g., IPT policy and/or behavior profile/policy for Alice) using the disclosed techniques. As another example, if Bob attempts to transfer more than 10 MB within two hours to external/unauthorized site/SAAS 916, then prevention controller 902 can block network traffic associated with that session (e.g., using NGFWM to control an NGFW that is monitoring Bob's session associated with that file transfer activity), kill a transfer file thread/process on Bob's client device (e.g., using ESM to control an endpoint security agent on Alice's endpoint being used for that file transfer activity), generate an alert (e.g., using alerter 726 of the prevention controller as shown in FIG. 7), and/or perform some other response based on a policy (e.g., IPT policy and/or behavior profile/policy for Bob, such as to quarantine Bob's client device or restrict access from Bob's client device to a secured virtual LAN (VLAN)) using the disclosed techniques.

As yet another example, the behavior profiles (e.g., behavior policies) can be configured to control/restrict allowed user file transfer activities based on one or more metrics/criteria (e.g., file transfer related usage restrictions) for one or more file transfer applications/activities. In this case, the behavior profiles (e.g., behavior policies) can include restrictions to cap a data transfer size to, for example, 50 MB for allowed file transfer activities or some other cap per activity/session, and cap a total amount of data transfers to, for example, 10 MB within a two hour time period or some other cap and time period, for allowed file types for authorized/allowed external sites (e.g., both Alice and Bob are allowed to transfer files using/to the external sites of authorized SAAS #1 912 and authorized SAAS #2 914), which can be added to behavior profiles for users Alice and Bob to control/restrict such allowed file transfer applications/activities. In this case, the behavior profiles (e.g., behavior policies) for each of Alice and Bob can be configured to allow and, in some cases, also generate an alert (e.g., or other responses/actions) if Alice or Bob perform file transfer activities that exceed such threshold usage restrictions.

As similarly discussed above, active prevention policies can also be implemented using behavior profiles (e.g., behavior policies) that can be generated and/or applied/implemented on a per user basis. A given file transfer application/activity can be disallowed (e.g., blacklisted) for a user or group of users as file transfer application/activity that is not allowed to be used for file transfer activities. For example, ACME Company can prohibit enterprise users from utilizing example-site.com for any file transfer activities. In this case, if Alice or Bob attempt to perform file transfer activities using/to the external site of example-site.com, then prevention controller 902 can automatically prevent such file transfer activities (e.g., using validator 714 as shown in FIG. 7 to generate a not allowed decision, which can transmit a network action to block the associated session or transmit an endpoint action to kill the associated transfer thread/process on the endpoint, and/or perform other responses/actions, such as to generate an alert warning the user that such is a disallowed file transfer application/activity).

As similarly discussed above, active prevention/behavior profiles (e.g., behavior policies) can also be implemented using behavior profiles (e.g., behavior policies) that can be generated and/or applied/implemented on a per user basis. A given file transfer application/activity to an external site that is in a prohibited region can be disallowed for a user or group of users as file transfer application/activity that is not allowed to be used for file transfer activities. For example, ACME Company can prohibit enterprise users from performing any file transfer activities to external sites in prohibited regions, such as a specified untrusted region/country. In this case, if Alice or Bob attempts to perform file transfer activities using/to an external site in that specified untrusted region/country, then prevention controller 902 can automatically prevent such file transfer activities (e.g., using validator 714 as shown in FIG. 7 to generate a not allowed decision, which can transmit a network action to block the associated session or transmit an endpoint action to kill the associated transfer thread/process on the endpoint, and/or perform other responses/actions, such as to generate an alert warning the user that such is a disallowed file transfer application/activity as it is associated with the specified untrusted region/country).

As will now be apparent to one of ordinary skill in the art in view of the disclosed embodiments and above-described use cases, the disclosed techniques can similarly be applied to implement automated insider threat prevention for various other use case scenarios utilizing various implemented behavior profiles (e.g., behavior policies) and/or utilizing various implemented active prevention/behavior profiles (e.g., behavior policies) to facilitate automated insider threat prevention for enterprise networks implemented using an integrated platform for automated insider threat prevention, which can detect and prevent insider attacks and/or outsider attacks that may attempt to, for example, exfiltrate data from enterprise networks.

FIG. 10 is a screen diagram illustrating a screen shot of a log view generated by the integrated platform for providing automated insider threat prevention in accordance with some embodiments. In one embodiment, FIG. 10 is a screenshot showing input data that is natively present for all users in the integrated platform for providing automated insider threat prevention, such as described above with respect to FIGS. 1-9.

Processes for Automated Insider Threat Prevention

Figure 11:
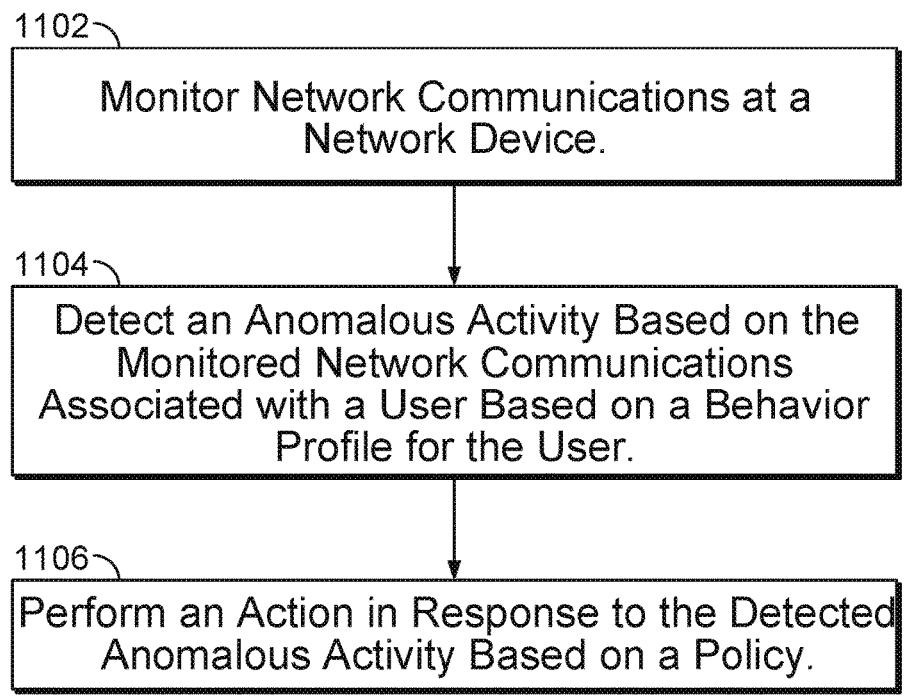
FIG. 11 is a flow diagram for performing automated insider threat prevention in accordance with some embodiments.

FIG. 11 is a flow diagram for performing automated insider threat prevention in accordance with some embodiments. In various embodiments, the process shown in FIG. 11 is performed by the network device/firewall as similarly described above with respect to FIGS. 1-10.

At 1102, network communications are monitored at a network device. For example, network traffic can be monitored at network devices/firewalls, such as network device 402/firewall 412 as shown in FIG. 4 and network device/firewall 704 as shown in FIG. 7.

At 1104, detecting an anomalous activity based on the monitored network communications associated with a user based on a behavior profile for the user is performed. For example, the anomalous activity based on the monitored network communications associated with a user based on a behavior profile for the user can be implemented using the network device/firewall and/or a prevention controller, such as prevention controller 450 as shown in FIGS. 4 and 7.

In one embodiment, monitoring network traffic between a client/web browser/application/process and a server/external site includes decrypting the network traffic to perform the disclosed techniques for automated insider threat prevention. For example, the network traffic between a client and a server can be decrypted for monitoring using the firewall. In this example, the network device/firewall can send a request to establish the encrypted session on behalf of the client to the remote server, and the network device/firewall can send an encrypted session response to the client on behalf of the remote server using a session key associated with the network device/firewall, such as similarly described above with respect to FIG. 3B. The encrypted traffic between the client and remote server can then be decrypted at the network device/firewall so that the network device/firewall can monitor decrypted session traffic between the client and the remote server over the tunnel based on one or more firewall policies, including an insider threat prevention policy, such as described above.

At 1106, an action is performed in response to the detected anomalous activity based on a policy. For example, responsive action(s) can include one or more of the following: blocking the network traffic, generating an alert, logging the network activity, and/or some other responsive action(s) can be performed based on the policy (e.g., a behavior profile/policy and/or a firewall/IPT policy).

In one embodiment, the network device/firewall is in communication with a cloud security service and can perform the above-described techniques to detect anomalous activity based on a policy (e.g., anomalous file transfer activity based on behavior profiles for users) using shared intelligence from one or more network devices/firewalls that detect file transfer related activities across different sites and/or different network devices/firewalls.

Figure 12:
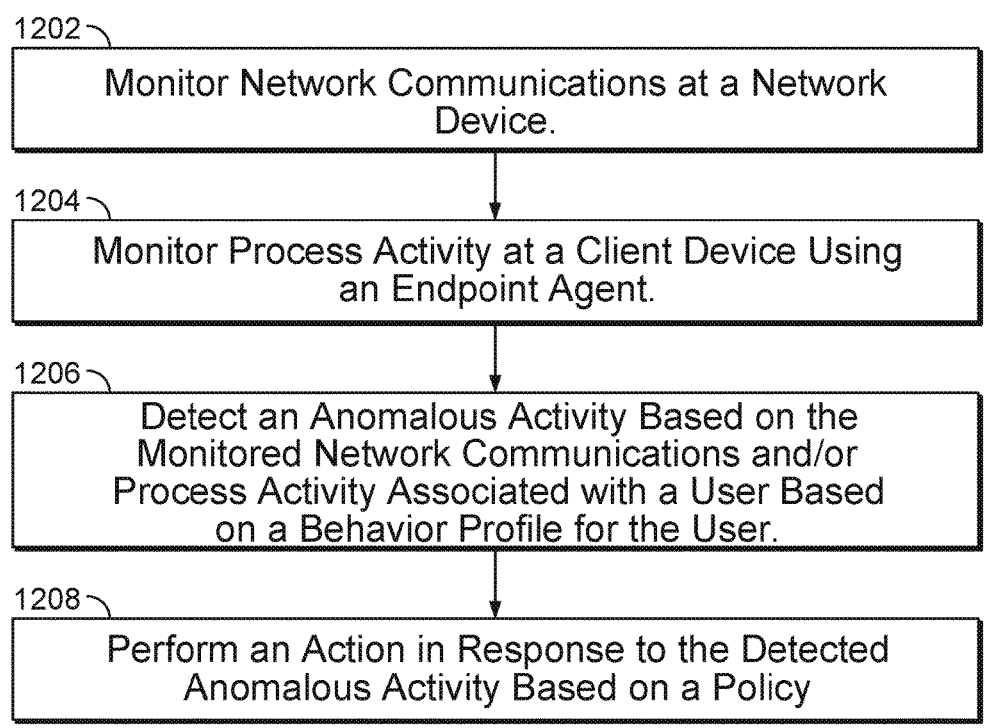
FIG. 12 is another flow diagram for performing automated insider threat prevention in accordance with some embodiments.

FIG. 12 is another flow diagram for performing automated insider threat prevention in accordance with some embodiments. In various embodiments, the process shown in FIG. 12 is performed by the network device/firewall as similarly described above with respect to FIGS. 1-10.

At 1202, network communications are monitored at a network device. For example, network traffic can be monitored at network devices/firewalls, such as network device 402/firewall 412 as shown in FIG. 4 and network device/firewall 704 as shown in FIG. 7.

At 1204, process activity is monitored at a client device using an endpoint agent. For example, applications/processes can be monitored at client devices (e.g., endpoints) using endpoint agents, such as HA 414 as shown in FIG. 4 or endpoint security agent 706 as shown in FIG. 7.

At 1206, detecting an anomalous activity based on the monitored network communications and/or process activity associated with a user based on a behavior profile for the user is performed. For example, the anomalous activity based on the monitored network communications and/or process activity associated with a user based on a behavior profile for the user can be implemented using the network device/firewall (e.g., 402/412 as shown in FIG. 4), endpoint agent, such as HA 414 as shown in FIG. 4 or endpoint security agent 706 as shown in FIG. 7, and/or the prevention controller, such as prevention controller 450 as shown in FIGS. 4 and 7.

At 1208, an action is performed in response to the detected anomalous activity based on a policy. For example, responsive action(s) can include one or more of the following: blocking the network traffic, killing the process on the endpoint, generating an alert, logging the network activity, and/or some other responsive action(s) can be performed based on the policy (e.g., a behavior profile/policy and/or a firewall/IPT policy).

In one embodiment, the network device/firewall is in communication with a cloud security service and can perform the above-described techniques to detect anomalous activity based on a policy (e.g., anomalous file transfer activity based on behavior profiles for users) using shared intelligence from one or more network devices/firewalls and endpoint agents that detect file transfer related activities across different sites, different network devices/firewalls, and/or endpoints.

Figure 13:
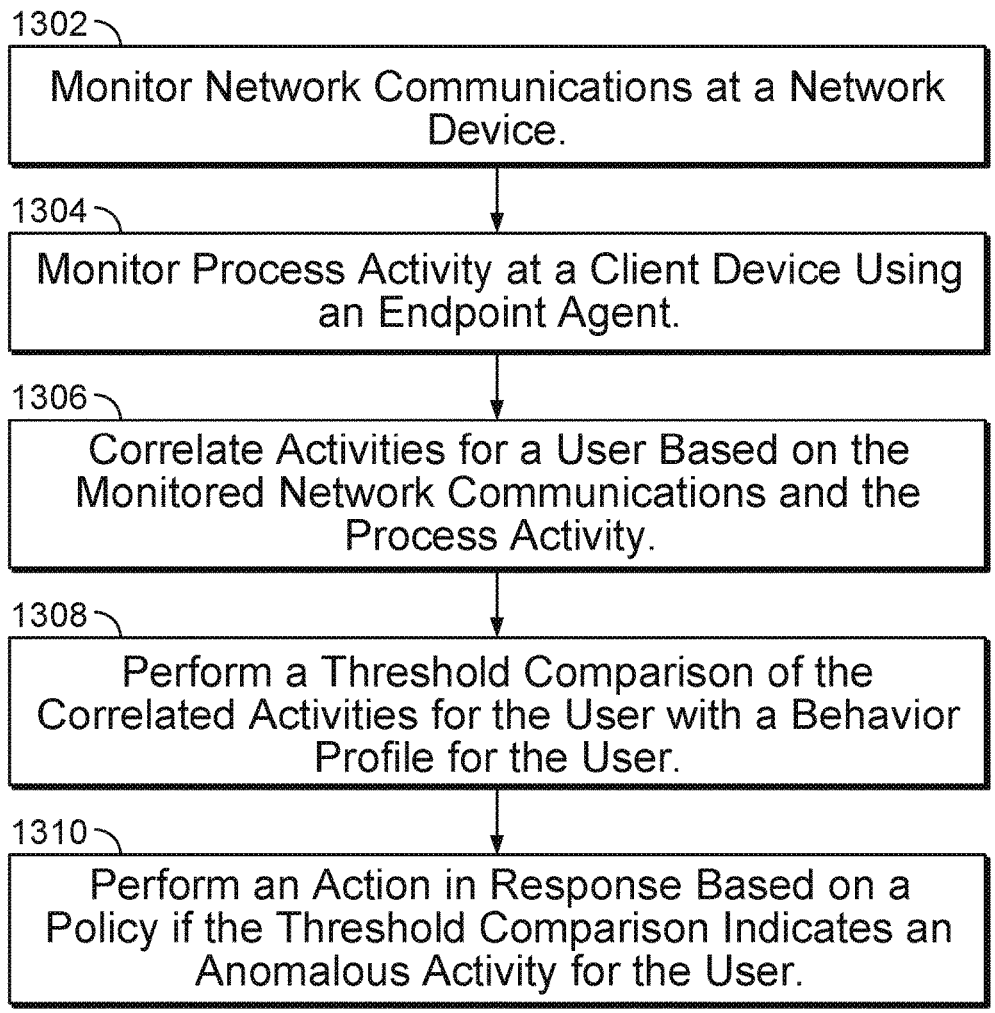
FIG. 13 is another flow diagram for performing automated insider threat prevention in accordance with some embodiments.

FIG. 13 is another flow diagram for performing automated insider threat prevention in accordance with some embodiments. In various embodiments, the process shown in FIG. 13 is performed by the network device/firewall as similarly described above with respect to FIGS. 1-10.

At 1302, network communications are monitored at a network device. For example, network traffic can be monitored at network devices/firewalls, such as network device 402/firewall 412 as shown in FIG. 4 and network device/firewall 704 as shown in FIG. 7.

At 1304, process activity is monitored at a client device using an endpoint agent. For example, applications/processes can be monitored at client devices (e.g., endpoints) using endpoint agents, such as HA 414 as shown in FIG. 4 or endpoint security agent 706 as shown in FIG. 7.

At 1306, correlating activities for a user based on the monitored network communications and the process activity is performed. For example, the prevention controller can correlate activities for a user based on the monitored network communications and the process activity, such as similarly described above with respect to FIG. 7.

At 1308, a threshold comparison of the correlated activities for the user with a behavior profile for the user is performed. For example, the prevention controller can perform the threshold comparison of the correlated activities for the user with a behavior profile for the user, such as similarly described above with respect to FIG. 7 (e.g., if a user's file transfer activities based on monitored network communications in combination with monitored endpoint activities exceed a threshold size of data for file transfer activities in a predetermined period of time based on a policy, then such can trigger the threshold and a responsive action can then be performed at 1310).

At 1310, an action is performed in response based on a policy if the threshold comparison indicates an anomalous activity for the user. For example, responsive action(s) can include one or more of the following: blocking the network traffic, killing the process on the endpoint, generating an alert, logging the network activity, and/or some other responsive action(s) can be performed based on the policy (e.g., a behavior profile/policy and/or a firewall/IPT policy).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automated insider threat prevention, comprising:
   a processor of a network device configured to:
      monitor network communications at the network device, wherein monitor network communications at the network device comprises:
         monitor encrypted network communications between a client device and an external site, wherein the encrypted network communications are encrypted using a first protocol;
         decrypt the encrypted network communications between the client device and the external site; and
         determine if the encrypted network communications between the client device and the external site include a file transfer activity from the client device to the external site;
      detect a plurality of anomalous file transfer activities based on the monitored network communications associated with a user based on a behavior profile for the user, wherein the monitored network communications associated with the user include the file transfer activity from the client device to the external site, and wherein the file transfer activity from the client device to the external site is determined to be an anomalous activity based on the behavior profile for the user; and
      perform an action in response to the plurality of anomalous file transfer activities based on a policy; and
   a memory coupled to the processor and configured to provide the processor with instructions.

2. The system recited in claim 1, wherein the network device includes a firewall.

3. The system recited in claim 1, wherein the plurality of anomalous file transfer activities is determined to be suspicious based on a threshold comparison with the behavior profile for the user.

4. The system recited in claim 1, wherein the behavior profile for the user includes a plurality of metrics based on one or more file transfer application activities associated with the user.

5. The system recited in claim 1, wherein the processor is further configured to:
   monitor a file transfer application activity based on the monitored network communications, wherein the monitored network communications are determined to be associated with the user; and
   detect the anomalous activity based on the monitored file transfer application activity associated with the user based on the behavior profile for the user.

6. The system recited in claim 1, wherein the processor is further configured to:
   monitor a file transfer application activity based on the monitored network communications, wherein the monitored network communications are determined to be associated with the user; and
   detect the anomalous activity based on the monitored file transfer application activity associated with the user based on a threshold comparison with the behavior profile for the user.

7. The system recited in claim 1, wherein the network device is in communication with an endpoint agent executed on the client device associated with the user, and wherein the endpoint agent is configured to monitor a file transfer application executed on the client device.

8. The system recited in claim 1, wherein the network device is in communication with an endpoint agent executed on the client device associated with the user, wherein the endpoint agent is configured to monitor a file transfer application executed on the client device, and wherein the processor is further configured to:
   receive a notification of a file transfer application activity associated with the file transfer application executed on the client device from the endpoint agent; and
   detect the anomalous activity based on the file transfer application activity associated with the user based on the behavior profile for the user, wherein the file transfer application activity associated with the user is detected using the endpoint agent executed on the client device and/or a firewall executed on the network device.

9. The system recited in claim 1,
   wherein perform the action in response to the plurality of anomalous file transfer activities comprises:
      block one or more of the plurality of anomalous file transfer activities, throttle one or more of the plurality of anomalous file transfer activities, generate an alert based on one or more of the plurality of anomalous file transfer activities, log one or more of the plurality of anomalous file transfer activities, update the behavior profile for the user based on one or more of the plurality of anomalous file transfer activities, or any combination thereof.

10. The system recited in claim 1, wherein the system comprises a plurality of network devices for automated insider threat prevention, and wherein the processor is further configured to:
send a notification associated with the anomalous activity to another network device.

11. The system recited in claim 1, wherein the system comprises a plurality of network devices for automated insider threat prevention, and wherein the processor is further configured to:
receive a notification associated with another anomalous activity associated with another user from another network device, wherein the another anomalous activity is detected based on monitored network communications associated with the another user based on another behavior profile for the another user.

12. The system recited in claim 1, wherein the system comprises a plurality of network devices for automated insider threat prevention, and wherein the processor is further configured to:
send a notification associated with the anomalous activity to another network device; and
receive a notification associated with another anomalous activity associated with another user from the another network device, wherein the another anomalous activity is detected based on monitored network communications associated with the another user based on another behavior profile for the another user.

13. The system recited in claim 1, wherein the network device is in communication with a cloud security service for automated insider threat prevention, and wherein the processor is further configured to:
send a notification associated with the anomalous activity to the cloud security service.

14. The system recited in claim 1, wherein the network device is in communication with a cloud security service for automated insider threat prevention, and wherein the processor is further configured to:
receive a notification associated with another anomalous activity associated with the user or with another user from the cloud security service.

15. The system recited in claim 1, wherein the network device is in communication with a cloud security service for automated insider threat prevention, and wherein the processor is further configured to:
send a notification associated with the anomalous activity to the cloud security service; and
receive a notification associated with another anomalous activity associated with the user or with another user from the cloud security service.

16. A method for automated insider threat prevention, comprising:
monitoring network communications at a network device, wherein monitoring network communications at the network device comprises:
monitoring encrypted network communications between a client device and an external site, wherein the encrypted network communications are encrypted using a first protocol;
decrypting the encrypted network communications between the client device and the external site; and
determining if the encrypted network communications between the client device and the external site include a file transfer activity from the client device to the external site;

detecting a plurality of anomalous file transfer activities based on the monitored network communications associated with a user based on a behavior profile for the user, wherein the monitored network communications associated with the user include the file transfer activity from the client device to the external site, and wherein the file transfer activity from the client device to the external site is determined to be an anomalous activity based on the behavior profile for the user; and
performing an action in response to the plurality of anomalous file transfer activities based on a policy.

17. The method of claim 16, wherein the plurality of anomalous file transfer activities is determined to be suspicious based on a threshold comparison with the behavior profile for the user.

18. The method of claim 16, wherein the behavior profile for the user includes a plurality of metrics based on one or more file transfer application activities associated with the user.

19. The method of claim 16, wherein the network device is in communication with an endpoint agent executed on the client device associated with the user, wherein the endpoint agent is configured to monitor a file transfer application executed on the client device, and further comprising:
receive a notification of a file transfer application activity associated with the file transfer application executed on the client device from the endpoint agent; and
detect the anomalous activity based on the file transfer application activity associated with the user based on the behavior profile for the user, wherein the file transfer application activity associated with the user is detected using the endpoint agent executed on the client device and/or a firewall executed on the network device.

20. The method of claim 16, wherein perform the action in response to the plurality of anomalous file transfer activities comprises:
block one or more of the plurality of anomalous file transfer activities, throttle one or more of the plurality of anomalous file transfer activities, generate an alert based on one or more of the plurality of anomalous file transfer activities, log one or more of the plurality of anomalous file transfer activities, update the behavior profile for the user based on one or more of the plurality of anomalous file transfer activities, or any combination thereof.

21. The method of claim 16, further comprising:
send a notification associated with the anomalous activity to another network device.

22. The method of claim 16, further comprising:
receive a notification associated with another anomalous activity associated with another user from another network device, wherein the another anomalous activity is detected based on monitored network communications associated with the another user based on another behavior profile for the another user.

23. A computer program product for automated insider threat prevention, the computer program product being embodied in a non-transitory tangible computer readable storage medium and comprising computer instructions for:
monitoring network communications at a network device, wherein monitoring network communications at the network device comprises:
monitoring encrypted network communications between a client device and an external site, wherein the encrypted network communications are encrypted using a first protocol;

decrypting the encrypted network communications between the client device and the external site; and determining if the encrypted network communications between the client device and the external site include a file transfer activity from the client device to the external site;

detecting a plurality of anomalous file transfer activities based on the monitored network communications associated with a user based on a behavior profile for the user, wherein the monitored network communications associated with the user include the file transfer activity from the client device to the external site, and wherein the file transfer activity from the client device to the external site is determined to be an anomalous activity based on the behavior profile for the user; and performing an action in response to the plurality of anomalous file transfer activities based on a policy.

24. The computer program product recited in claim 23, wherein the plurality of anomalous file transfer activities is determined to be suspicious based on a threshold comparison with the behavior profile for the user.

25. The computer program product recited in claim 23, wherein the behavior profile for the user includes a plurality of metrics based on one or more file transfer application activities associated with the user.

26. The computer program product recited in claim 23, wherein the network device is in communication with an endpoint agent executed on the client device associated with the user, wherein the endpoint agent is configured to monitor a file transfer application executed on the client device, and further comprising computer instructions for:

receive a notification of a file transfer application activity associated with the file transfer application executed on the client device from the endpoint agent; and detect the anomalous activity based on the file transfer application activity associated with the user based on the behavior profile for the user, wherein the file transfer application activity associated with the user is detected using the endpoint agent executed on the client device and/or a firewall executed on the network device.

27. The computer program product recited in claim 23, wherein perform the action in response to the plurality of anomalous file transfer activities comprises:

block one or more of the plurality of anomalous file transfer activities, throttle one or more of the plurality of anomalous file transfer activities, generate an alert based on one or more of the plurality of anomalous file transfer activities, log one or more of the plurality of anomalous file transfer activities, update the behavior profile for the user based on one or more of the plurality of anomalous file transfer activities, or any combination thereof.

28. The computer program product recited in claim 23, further comprising computer instructions for:

send a notification associated with the anomalous activity to another network device.

29. The computer program product recited in claim 23, further comprising computer instructions for:

receive a notification associated with another anomalous activity associated with another user from another network device, wherein the another anomalous activity is detected based on monitored network communications associated with the another user based on another behavior profile for the another user.

* * * * *